United States Patent
Momtahan

(10) Patent No.: US 11,870,492 B2
(45) Date of Patent: Jan. 9, 2024

(54) OPTICAL STRUCTURES IN DIRECTIONAL FREE-SPACE OPTICAL COMMUNICATION SYSTEMS FOR PORTABLE ELECTRONIC DEVICES

(71) Applicant: Apple Inc., Cupertino, CA (US)

(72) Inventor: Omid Momtahan, Palo Alto, CA (US)

(73) Assignee: Apple Inc., Cupertino, CA (US)

(*) Notice: Subject to any disclaimer, the term of this patent is extended or adjusted under 35 U.S.C. 154(b) by 0 days.

(21) Appl. No.: 17/714,439

(22) Filed: Apr. 6, 2022

(65) Prior Publication Data

US 2022/0231761 A1 Jul. 21, 2022

Related U.S. Application Data

(63) Continuation of application No. 16/298,696, filed on Mar. 11, 2019, now Pat. No. 11,303,355.

(60) Provisional application No. 62/678,210, filed on May 30, 2018.

(51) Int. Cl.
| | |
|---|---|
| *H04B 10/11* | (2013.01) |
| *G02B 19/00* | (2006.01) |
| *G01J 1/44* | (2006.01) |
| *G01J 1/04* | (2006.01) |

(52) U.S. Cl.
CPC ............ *H04B 10/11* (2013.01); *G01J 1/0411* (2013.01); *G01J 1/44* (2013.01); *G02B 19/0028* (2013.01); *G02B 19/0076* (2013.01)

(58) Field of Classification Search
CPC ... H04B 10/11; H04B 10/112; H04B 10/1121; H04B 10/1123; H04B 10/1125; H04B 10/1127; H04B 10/1129; H04B 10/114; H04B 10/1141; H04B 10/1143; H04B 10/1149; H04B 10/116; G01J 1/0411; G01J 1/0407; G01J 1/04; G01J 1/44; G02B 19/0028; G02B 19/0076
See application file for complete search history.

(56) References Cited

U.S. PATENT DOCUMENTS

| | | |
|---|---|---|
| 5,539,562 A | 7/1996 | Morioka |
| 5,974,071 A | 10/1999 | Jiang et al. |
| 5,978,401 A | 11/1999 | Morgan |
| 6,055,262 A | 4/2000 | Cox et al. |
| 6,253,097 B1 | 6/2001 | Aronow et al. |

(Continued)

FOREIGN PATENT DOCUMENTS

| | | |
|---|---|---|
| CN | 2738434 | 11/2005 |
| CN | 101592605 | 12/2009 |

(Continued)

OTHER PUBLICATIONS

U.S. Appl. No. 18/077,988, filed Dec. 8, 2022, Hui et al.

(Continued)

*Primary Examiner* — John R Lee
(74) *Attorney, Agent, or Firm* — Brownstein Hyatt Farber Schreck, LLP

(57) ABSTRACT

A directional free-space optical communication system includes a source device including a laser diode and an endpoint device including a photodiode. The endpoint device also includes an optical structure, such as an optical adapter, that increases both angular and spatial offset tolerance between the two source device and the endpoint device.

20 Claims, 21 Drawing Sheets

(56) References Cited

U.S. PATENT DOCUMENTS

| | | | |
|---|---|---|---|
| 6,272,269 B1 | 8/2001 | Naum | |
| 6,310,707 B1 | 10/2001 | Kawase et al. | |
| 6,348,684 B1* | 2/2002 | Nykolak | H04B 10/1121 250/216 |
| 6,459,835 B1 | 10/2002 | Nagaoka et al. | |
| 6,574,398 B2 | 6/2003 | Coldren et al. | |
| 6,592,245 B1 | 7/2003 | Tribelsky et al. | |
| 6,597,713 B2 | 7/2003 | Ouchi | |
| 6,636,539 B2 | 10/2003 | Martinsen | |
| 6,814,901 B2 | 11/2004 | Itoh | |
| 6,829,442 B2* | 12/2004 | Murray | H04B 10/112 398/131 |
| 6,967,754 B2 | 11/2005 | Bratt et al. | |
| 6,987,306 B2 | 1/2006 | Fathimulla et al. | |
| 7,157,298 B2 | 1/2007 | Nakayama et al. | |
| 7,264,408 B2 | 9/2007 | Togami et al. | |
| 7,277,463 B2 | 10/2007 | Guenter | |
| 7,286,766 B2 | 10/2007 | Shelton | |
| 7,349,604 B2 | 3/2008 | Clark | |
| 7,692,859 B2 | 4/2010 | Redert | |
| 7,791,591 B2 | 9/2010 | Collins et al. | |
| 7,804,875 B2 | 9/2010 | Park et al. | |
| 8,038,822 B2 | 10/2011 | Kindler | |
| 8,073,343 B2 | 12/2011 | Yuki et al. | |
| 8,113,724 B2 | 2/2012 | Terada et al. | |
| 8,153,502 B2* | 4/2012 | Li | H01L 21/76224 257/E21.546 |
| 8,319,311 B2* | 11/2012 | Chen | H01L 29/66795 257/E21.546 |
| 8,467,428 B2 | 6/2013 | Gerlach et al. | |
| 8,598,673 B2* | 12/2013 | Joshi | H01L 31/03046 257/458 |
| 8,783,893 B1 | 7/2014 | Seurin et al. | |
| 8,823,859 B2 | 9/2014 | Fujimori et al. | |
| 8,890,844 B2 | 11/2014 | Hung et al. | |
| 8,976,158 B2 | 3/2015 | Eriksson et al. | |
| 8,988,574 B2 | 3/2015 | Oshima et al. | |
| 8,995,841 B1 | 3/2015 | Chalfant, III et al. | |
| 9,091,747 B2 | 7/2015 | Pruijmboom | |
| 9,112,330 B2 | 8/2015 | Gronenborn et al. | |
| 9,164,625 B2 | 10/2015 | Holmgren et al. | |
| 9,171,723 B2 | 10/2015 | Hallam | |
| 9,215,293 B2 | 12/2015 | Miller | |
| 9,312,954 B2 | 4/2016 | Chen et al. | |
| 9,318,873 B2 | 4/2016 | Nagatomo | |
| 9,397,476 B2 | 7/2016 | Baier | |
| 9,406,716 B2 | 8/2016 | Lin | |
| 9,525,093 B2 | 12/2016 | Costello et al. | |
| 9,544,539 B2 | 1/2017 | Roman | |
| 9,612,390 B2 | 4/2017 | Thompson et al. | |
| 9,799,727 B2* | 10/2017 | Zhou | H01L 21/31053 |
| 9,810,862 B2 | 11/2017 | Graves et al. | |
| 9,825,086 B2 | 11/2017 | Kawahara | |
| 9,860,965 B2 | 1/2018 | Recker et al. | |
| 9,917,643 B2 | 3/2018 | Shatz et al. | |
| 9,929,806 B2 | 3/2018 | Wabnig et al. | |
| 9,998,217 B2 | 6/2018 | Li et al. | |
| 10,031,158 B1 | 7/2018 | Douglas et al. | |
| 10,032,946 B2 | 7/2018 | Lanzara et al. | |
| 10,072,815 B2 | 9/2018 | MacKinnon et al. | |
| 10,148,365 B2 | 12/2018 | Sundaram | |
| 10,177,186 B2 | 1/2019 | Wang | |
| 10,181,895 B2 | 1/2019 | Liu | |
| 10,267,505 B2 | 4/2019 | Van de Sluis et al. | |
| 10,293,691 B2 | 5/2019 | Mishra et al. | |
| 10,305,605 B2 | 5/2019 | Sun et al. | |
| 10,353,130 B2 | 7/2019 | Vandenberg et al. | |
| 10,367,021 B2 | 7/2019 | Jangjian | |
| 10,371,328 B2 | 8/2019 | Poage | |
| 10,476,591 B2* | 11/2019 | Laycock | H04B 10/112 |
| 10,511,383 B2 | 12/2019 | Tiecke et al. | |
| 10,571,680 B2 | 2/2020 | Igarashi | |
| 10,574,916 B2 | 2/2020 | Fukuda | |
| 10,601,507 B2 | 3/2020 | Wabnig et al. | |
| 10,663,586 B2 | 5/2020 | Pacala et al. | |
| 10,700,780 B2 | 6/2020 | Momtahan et al. | |
| 10,705,347 B2 | 7/2020 | Chen et al. | |
| 10,756,815 B2 | 8/2020 | Shih et al. | |
| 10,764,053 B2 | 9/2020 | Brook et al. | |
| 10,840,396 B2 | 11/2020 | Balimann et al. | |
| 10,871,820 B2* | 12/2020 | Mutlu | G01B 11/14 |
| 10,903,913 B2 | 1/2021 | Sundaram | |
| 10,911,727 B2 | 2/2021 | MacKinnon | |
| 10,935,215 B1 | 3/2021 | Lin et al. | |
| 10,948,567 B2 | 3/2021 | Eberspach et al. | |
| 11,099,347 B2 | 8/2021 | Takenaka et al. | |
| 11,157,113 B2 | 10/2021 | Winkler et al. | |
| 11,169,446 B2 | 11/2021 | Dietrich et al. | |
| 11,187,643 B2 | 11/2021 | Jutte et al. | |
| 11,201,669 B2 | 12/2021 | Momtahan et al. | |
| 11,303,355 B2 | 4/2022 | Momtahan | |
| 11,381,307 B2 | 7/2022 | Joseph | |
| 11,549,799 B2 | 1/2023 | Tan et al. | |
| 2003/0036356 A1* | 2/2003 | Witehira | H04B 10/11 379/56.1 |
| 2003/0043435 A1 | 3/2003 | Oettinger et al. | |
| 2003/0053506 A1 | 3/2003 | Coldren | |
| 2004/0004745 A1* | 1/2004 | Bratt | H04B 10/40 359/15 |
| 2004/0057228 A1 | 3/2004 | Huang et al. | |
| 2005/0012106 A1* | 1/2005 | Fathimulla | H01L 29/7376 257/82 |
| 2005/0168445 A1 | 8/2005 | Piot et al. | |
| 2005/0224701 A1 | 10/2005 | Austin | |
| 2005/0244110 A1* | 11/2005 | Togami | G02B 6/4292 385/92 |
| 2006/0103941 A1 | 5/2006 | Yamaguchi et al. | |
| 2007/0177842 A1* | 8/2007 | Clark | G02B 6/4239 385/52 |
| 2010/0085466 A1* | 4/2010 | Fujimori | H01L 27/14687 348/340 |
| 2011/0278692 A1* | 11/2011 | Takeuchi | H01L 27/14618 257/434 |
| 2012/0006382 A1 | 1/2012 | Dagli et al. | |
| 2013/0328999 A1* | 12/2013 | Roman | H04N 7/15 348/14.08 |
| 2014/0213034 A1* | 7/2014 | Chang | H01L 21/76232 438/424 |
| 2015/0034143 A1* | 2/2015 | Lanzara | G02B 19/0028 136/246 |
| 2015/0144918 A1 | 5/2015 | Cho et al. | |
| 2015/0311673 A1 | 10/2015 | Wang et al. | |
| 2016/0178884 A1* | 6/2016 | Hanada | G02B 23/243 359/738 |
| 2017/0052334 A1* | 2/2017 | Graves | G02B 6/4206 |
| 2017/0276857 A1* | 9/2017 | Vandenberg | G02B 27/0994 |
| 2017/0302374 A1* | 10/2017 | Shatz | G02B 19/0095 |
| 2017/0322411 A1* | 11/2017 | Igarashi | G02B 23/2484 |
| 2017/0346556 A1* | 11/2017 | Tiecke | H04B 10/112 |
| 2017/0353680 A1* | 12/2017 | Fukuda | H04N 25/75 |
| 2018/0191449 A1* | 7/2018 | Sundaram | H04B 10/801 |
| 2018/0269987 A1* | 9/2018 | Sun | H04B 10/6911 |
| 2018/0278828 A1 | 9/2018 | Moon | |
| 2018/0341094 A1 | 11/2018 | Brukilacchio | |
| 2018/0367767 A1* | 12/2018 | MacKinnon | H04N 25/709 |
| 2019/0081187 A1* | 3/2019 | Balimann | G03B 43/00 |
| 2019/0146088 A1* | 5/2019 | Pacala | G01S 7/4865 356/4.01 |
| 2019/0199438 A1* | 6/2019 | Shih | H04B 10/1121 |
| 2019/0199444 A1* | 6/2019 | Sundaram | H04B 10/803 |
| 2019/0258175 A1* | 8/2019 | Dietrich | B29C 59/16 |
| 2019/0331473 A1 | 10/2019 | Johnson et al. | |
| 2019/0369405 A1* | 12/2019 | Chen | F21V 5/004 |
| 2019/0372666 A1* | 12/2019 | Momtahan | H04B 10/11 |
| 2019/0372667 A1* | 12/2019 | Momtahan | G02B 26/0875 |
| 2019/0384030 A1* | 12/2019 | Takenaka | H04N 23/55 |
| 2020/0328810 A1* | 10/2020 | Momtahan | G02B 26/101 |
| 2020/0370922 A1* | 11/2020 | Mort | G01D 4/004 |
| 2021/0003385 A1 | 1/2021 | Tan et al. | |
| 2022/0231761 A1* | 7/2022 | Momtahan | H04B 10/11 |

(56) References Cited

U.S. PATENT DOCUMENTS

2023/0089141 A1    3/2023    Chen et al.
2023/0152081 A1    5/2023    Tan et al.

FOREIGN PATENT DOCUMENTS

| CN | 102575925 | 7/2012 |
|---|---|---|
| CN | 105716526 | 6/2016 |
| EP | 3176888 | 6/2017 |
| JP | 2000174543 | 6/2000 |
| JP | 2004047636 | 2/2004 |
| KR | 1020070061191 | 6/2007 |
| KR | 1020190039927 | 4/2019 |
| WO | WO 10/111961 | 10/2010 |
| WO | WO 17/218467 | 12/2017 |
| WO | WO 18/128904 | 7/2018 |

OTHER PUBLICATIONS

U.S. Appl. No. 18/094,255, filed Jan. 6, 2022, Tan et al.
U.S. Appl. No. 17/480,704, filed Sep. 21, 2021, Chen et al.
Huang et al., "A nanoelectromechanical tunable laser," *nature photonics*, vol. 2, Mar. 2008, pp. 180-184.
Leitgeb et al., "Using Tapers for Efficient Coupling of Received FSO-Signals into Fibres," 13th International Conference on Transparent Optical Networks in Stockholm, Sweden, Jun. 26-30, 2011, Institute of Broadband Communications, University of Technology, Graz, Austria, pp. 1-6.
U.S. Appl. No. 18/143,517, filed May 4, 2023, Lin et al.

\* cited by examiner

OPTICAL STRUCTURES IN DIRECTIONAL FREE-SPACE OPTICAL COMMUNICATION SYSTEMS FOR PORTABLE ELECTRONIC DEVICES

CROSS REFERENCE TO RELATED APPLICATIONS

This application is a continuation of U.S. patent application Ser. No. 16/298,696, filed Mar. 11, 2019, which is a non-provisional patent application and claims the benefit of U.S. Provisional Patent Application No. 62/678,210, filed May 30, 2018, the disclosure of which is hereby incorporated herein by reference in its entirety.

FIELD

Embodiments described herein relate to free-space optical communication systems for portable electronic devices and, in particular, to optical structures for such devices configured to increase angular and positional misalignment tolerance.

BACKGROUND

An electronic device can include a free-space optical communication system to wirelessly exchange data with another electronic device. In some cases, the optical communication system may be configured to be directional (e.g., line-of-sight) in order to increase data transfer rates, to increase data transfer privacy, or for any other suitable purpose.

However, a conventional directional free-space optical communication system is exceptionally dependent on precise alignment of the communicating devices. As such, conventional free-space optical communication systems cannot be incorporated into portable electronic devices that may be moved or repositioned from time to time.

SUMMARY

Many embodiments described reference an apparatus (e.g., a portable electronic device or a component in a portable electronic device) for directional free-space optical communication. The apparatus includes a substrate, a photosensitive element coupled to the substrate, an optical adapter above the photosensitive element, and an optically-clear adhesive coupling of the optical adapter to the photosensitive element. The optical adapter typically has a tapered shape, but this may not be required. In some examples, a lens can be positioned over the optical adapter to focus a greater quantity of light into a body of the optical adapter. As a result of this construction, the apparatus provides a greater acceptance angle for directional free-space optical communication in both angular and spatial domains.

Further embodiments described reference an optical adapter for free-space optical communication in a portable electronic device. More specifically, the optical adapter includes a first face having a first diameter, a second face having a second diameter less than the first diameter, and a body between the first face and the second face. The body of the optical adapter defines a lateral surface that tapers at an angle from the first face to the second face. In some cases, the optical adapter further includes a convex lens positioned above the first face. In still further embodiments, a lens—taking any suitable shape—can be separated from an optical adapter, such as described herein, by a gap.

BRIEF DESCRIPTION OF THE DRAWINGS

Reference will now be made to representative embodiments illustrated in the accompanying figures. It should be understood that the following descriptions are not intended to limit this disclosure to one included embodiment. To the contrary, the disclosure provided herein is intended to cover alternatives, modifications, and equivalents as may be included within the spirit and scope of the described embodiments, and as defined by the appended claims.

The use of the same or similar reference numerals in different figures indicates similar, related, or identical items.

Figure 1A:
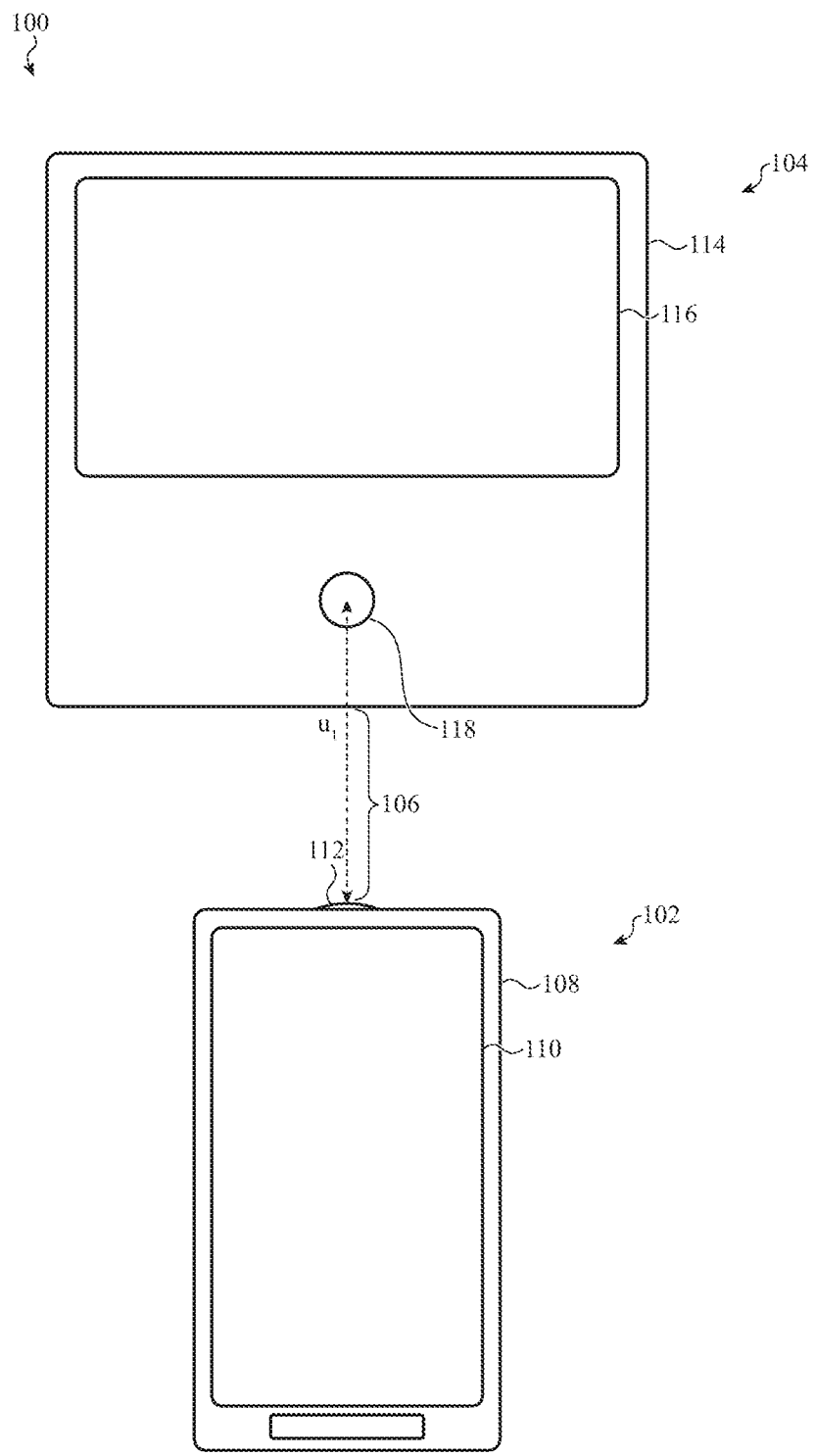
FIG. 1A depicts a directional free-space optical communication system coupling two electronic devices.

Cross-hatching or shading in the accompanying figures is generally provided to clarify the boundaries between adjacent elements and also to facilitate legibility of the figures. Accordingly, neither the presence nor the absence of cross-hatching or shading conveys or indicates any preference or requirement for particular materials, material properties, element proportions, element dimensions, commonalities of similarly illustrated elements, or any other characteristic, attribute, or property for any element illustrated in the accompanying figures.

Similarly, certain accompanying figures include vectors, rays, traces and/or other visual representations of one or more example paths—which may include reflections, refractions, diffractions, and so on, through one or more mediums—that may be taken by one or more photons originating from one or more light sources shown or, or in some cases, omitted from, the accompanying figures. It is understood that these simplified visual representations of light are provided merely to facilitate an understanding of the various embodiments described herein and, accordingly, may not necessarily be presented or illustrated to scale or with angular precision or accuracy, and, as such, are not intended to indicate any preference or requirement for an illustrated embodiment to receive, emit, reflect, refract, focus, and/or diffract light at any particular illustrated angle, orientation, polarization, color, or direction, to the exclusion of other embodiments described or referenced herein.

Additionally, it should be understood that the proportions and dimensions (either relative or absolute) of the various features and elements (and collections and groupings thereof) and the boundaries, separations, and positional relationships presented therebetween, are provided in the accompanying figures merely to facilitate an understanding of the various embodiments described herein and, accordingly, may not necessarily be presented or illustrated to scale, and are not intended to indicate any preference or requirement for an illustrated embodiment to the exclusion of embodiments described with reference thereto.

DETAILED DESCRIPTION

Embodiments described herein reference electronic devices configured to receive data from other electronic devices via free-space optical communication.

As used herein, the phrase "free-space optical communication" refers to the delivery of digital and/or analog information or data from at least one "source device" to at least one "endpoint device" by selectively modulating and/or otherwise controlling the amplitude, frequency, phase, polarization, angle, pulse width, duty cycle, and/or any other suitable characteristic of visible or traditionally non-visible light propagating through a medium (e.g., gases, liquids, vacuum, and so on) that physically separates the source device(s) from the endpoint device(s).

Any stationary or portable electronic device can be either (or both) a source device or an endpoint device of a free-space optical communication system, such as described herein. Example electronic devices include, but are not limited to: mobile phone devices; tablet devices; laptop devices; desktop computers; computing accessories; peripheral input devices; home or business networking devices; aerial, marine, submarine, or terrestrial vehicle control devices or networking devices; mobile entertainment devices; augmented reality devices; virtual reality devices; industrial control devices; digital wallet devices; home or business security devices; wearable devices; health or medical devices; implantable devices; clothing-embedded devices; fashion accessory devices; home or industrial appliances; media appliances; and so on.

In some embodiments, a free-space optical communication system is "directional" in that focused light or laser light emitted from the source device(s) propagates through a medium between the source device(s) and the endpoint device(s) along a substantially line-of-sight path. A directional free-space optical communication system can facilitate increased data transfer rates (e.g., tens of gigabits per second to terabits per second), increased data transfer privacy, and increased data transfer security relative to conventional device-to-device data communication protocols, such as Wi-Fi, Near-Field Communications, or Bluetooth.

As noted above, a directional free-space optical communication system, such as described herein, includes at least a source device and at least one endpoint device. The source device includes at least one focused light source or laser light source and the endpoint device includes at least one photosensitive element. When light emitted from the laser light source of the source device is collimated (e.g., emitted with minimal or negligible beam divergence or convergence) and the photosensitive element of the endpoint device is positioned to accept the collimated light (e.g., the source device and the endpoint device are precisely aligned) a signal applied to modulate the laser light source can be received at the photosensitive element without substantial losses. In other words, the signal received by the photosensitive element can be characterized by a high signal-to-noise ratio that can facilitate a high data transfer rate from the source device to the endpoint device. In this configuration and alignment, the source device and the endpoint device can be described as "optically coupled." It may be appreciated that, in many embodiments, optically coupled devices can each include one or more light sources and one or more photosensitive elements to enable multi-channel and/or two-way communication and/or multi-device communication (e.g., three or more devices optically coupled). However, for simplicity of description, the embodiments that follow reference a directional free-space optical communication system configured for one-way, single-channel, data transfer from a source device to an endpoint device.

In this example, the light source of the source device can be any suitable electrical or electronic light source or combination of light sources, including both multipart and solid-state light sources. In many embodiments, a light source of a source device is a semiconductor light source such as, but not limited to: a vertical-cavity surface-emitting laser (a "VCSEL"); a vertical external-cavity surface-emitting laser; a light-emitting diode; an organic light-emitting diode; a resonant-cavity light-emitting diode; a micro-scale light-emitting diode; a superluminescent light-emitting diode; a broad-area laser diode; a diode-pumped laser; a mode-locked diode laser; an infrared band laser; an ultraviolet band laser; and so on.

In some embodiments, the light source of a source device can be optically coupled to one or more passive or active optical structures that direct, collimate, and/or focus light emitted from the light source in a particular direction or manner. Example optical structures can include, but may not be limited to: optical adapters; waveguides; optical fibers; reflectors; lenses; microlenses; beamforming and/or beam-directing lenses or lens structures; beam splitters; beam collimators; polarizers; movable lenses; color filters; cut filters; beam expanders; beam divergers; planar light wave circuits; and so on.

The photosensitive element of an endpoint device, such as described herein, can be any suitable photosensitive element or combination of elements, including both multipart and solid-state photosensitive elements operated in either photovoltaic mode (e.g., not reverse biased) or photoconductive mode (e.g., reverse biased). Example photosensitive elements include, but are not limited to: semiconductor photodiodes; semiconductor photodetectors; avalanche diodes; charge-coupled devices; and so on. Further, it may be appreciated that the size and shape of a photosensitive element can vary from embodiment to embodiment. In some cases, a "photosensitive area" of a photosensitive element can take a circular shape, whereas in other cases, the photosensitive area can take another shape (e.g., square, rectangular, octagonal, irregular, polygonal, and so on). Further, some embodiments can include more than one photosensitive area. For example, a first photosensitive area can be inset within a second photosensitive area of the same photosensitive element. In these examples, different photosensitive areas may be formed from different materials, or material combinations, and/or may have different photosensitivity or electrical characteristics (e.g., responsivity, rise time, fall time, reverse bias, dark current, and so on). In further examples, a photosensitive element can be constructed such that its photosensitive area exhibits particular electrical properties, at least in part, as a result of the materials, geometry, or dimensions of the photosensitive area. For example, it may be appreciated that different semiconductor materials (e.g., silicon, germanium, indium-gallium arsenide, gallium phosphide, and so on) may exhibit different electrical properties (e.g., responsivity, rise time, fall time, dark current, and so on) in response to stimulation by different spectral ranges and/or amplitudes of light. Similarly, different photosensitive area geometries and/or dimensions may result in different electrical properties. For example, smaller photosensitive areas may be associated with faster rise times and faster fall times.

As with the light source of the source device, in some embodiments, the photosensitive element of an endpoint device can be optically coupled to one or more passive or active optical structures that redirect and/or focus light onto the photosensitive area of the photosensitive element. Example optical structures can include, but may not be limited to: optical adapters; optical fibers; reflectors; lenses; microlenses; beamforming and/or beam-directing lenses or lens structures; beam collimators; polarizers; movable lenses; color filters; cut filters; beam concentrators; planar light wave circuits; and so on.

For simplicity of description, the embodiments that follow reference a source device including at least one VCSEL light source (hereinafter, a "laser" or "laser diode") that emits light in a spectral range including a traditionally non-visible frequency band (e.g., infrared light). Further, although not required for all embodiments, the example VCSEL light source described in reference to many embodiments that follow is presumed to be a Class 1 laser as defined by the American National Standards Association.

Similarly, for simplicity of description, the embodiments that follow reference an endpoint device including at least one semiconductor photodiode (hereinafter, a "photodiode"). The photodiode has a generally small, circular, photosensitive area (e.g., having a diameter of less than 100 m, such as 20-50 µm) and is operated in a photoconductive mode. The photosensitive area of this example photodiode is responsive to light in the spectral range emitted by the laser diode of the source device.

As noted above, a directional free-space optical communication system, such as described herein, preferably operates when the source device and the endpoint device are precisely aligned such that a considerable quantity (which may vary from embodiment to embodiment) of laser light emitted from the laser diode of the source device illuminates the photodiode of the endpoint device. Conversely, if the source device and the endpoint device are not precisely aligned, partial or total signal loss can occur because the laser diode may not effectively illuminate the photodiode.

To account for positional and/or angular offset(s) between the source device and the endpoint device—or, more generally, between the laser diode and the photodiode—many embodiments described herein reference optical structures for either or both the source device and the endpoint device that increase positional and/or angular offset tolerance.

For example, in some embodiments, the source device can include an optical structure such as a beam expander optically coupled to the laser diode and characterized by an output beam diameter that is larger than a diameter of a beam emitted from the laser diode. In another embodiment, the source device can include a lens or lens array optically coupled to the laser diode that causes the beam output from the laser diode to diverge at a particular angle. In other embodiments, these or other optical structures can be included to broaden the effective cross-sectional area of the beam emitted from the laser diode and/or to direct the beam emitted from the diode in a particular direction toward the photodiode of the endpoint device, thereby increasing positional and/or angular offset tolerance between the source device and the endpoint device.

In some embodiments, the endpoint device can include an optical structure to increase offset tolerances. Example optical structures can include an optical adapter formed from an optically transparent material in a shape that is tapered, transitioning from a large cross-sectional area to a smaller cross-sectional area. An example of such a shape is an inverted conical frustum, having a circular cross-section. In this example, the small-radius face of the conical frustum is optically coupled to the photodiode of the endpoint device and the large-radius face of the conical frustum is oriented toward the laser diode of the source device. In this embodiment, an angle defining the lateral face of the conical frustum is approximately equal to, or greater than, a critical angle for total internal reflection of light entering the large-radius face. As a result of this construction, an increased quantity of light can be "funneled" toward the photodiode as a result of repeated internal reflection.

In some embodiments, a reflective coating can be disposed onto the conical frustum to increase the quantity of light reflected toward the photodiode. In some embodiments, a convex lens can protrude from the large-radius face of the conical frustum in order to increase the field of view (also referred to as the "acceptance angle") of the optical adapter. In other examples, an optical adapter can take another shape such as, but not limited to: an inverted pyramidal frustum; an inverted polygonal frustum; a flared shape; a faceted shape; and so on. In many cases, an optical adapter is axially symmetric, but this is not required. For example, in some embodiments, an optical adapter such as described herein can be tilted, slanted, or otherwise biased in a particular direction. In other cases, an optical adapter such as described herein can be curved. In other cases, an optical adapter such as described herein can have an asymmetric cross-section. For simplicity of description, many embodiments that follow reference axially-symmetric optical adapters, but it may be appreciated that this is not required.

These foregoing and other embodiments are discussed below with reference to FIGS. 1A-10. However, those skilled in the art will readily appreciate that the detailed description given herein with respect to these figures is for explanatory purposes only and should not be construed as limiting.

FIG. 1A depicts a directional free-space optical communication system 100 communicably and optically coupling two electronic devices, identified as the source device 102 and the endpoint device 104. In the illustrated example, the source device 102 and the endpoint device 104 are separated by an air gap 106 (e.g., free space). In typical examples, the source device 102 and the endpoint device 104 are battery-operated portable electronic devices, but this may not be required; in some embodiments, one or both of the source device 102 and the endpoint device 104 are substantially stationary.

As noted above, the source device 102 and the endpoint device 104 can be any suitable electronic devices; example electronic devices are non-exhaustively listed above. The source device 102 includes a housing 108 enclosing, at least in part, an optical communication module 110 that includes a laser diode. Similarly, the endpoint device 104 includes a housing 112 enclosing, at least in part, an optical communication module 114 that includes a photodiode. In some cases, such as illustrated, the optical communication module 110 can extend at least partially through the housing 108, although this is not required. In some cases, a protective cover (e.g., lens window) can be provided in the housing 108. In these embodiments, the optical communication module 110 is positioned behind the protective cover. The optical communication module 114 can be similarly configured in the housing 112.

As noted with respect to other embodiments described herein, the source device 102 and the endpoint device 104 can be configured for multi-channel and/or two-way communication. In these examples, the optical communication module 110 of the source device 102 includes at least one photodiode and the optical communication module 114 of the endpoint device 104 includes at least one laser diode. For simplicity of description, one-way, single-channel communication from the source device 102 to the endpoint device 104 is described below.

The laser diode of the optical communication module 110 of the source device 102 emits a beam of light $u_1$ across the air gap 106 toward the photodiode of the optical communication module 114 of the endpoint device 104. As noted above, by modulating one or more characteristics of the beam of light $u_1$, the source device 102 can communicate digital and/or analog information to the endpoint device 104 (hereinafter referred to as, simply, "data" communicated from a source device to an endpoint device). Example beam characteristics that can be modulated by the source device 102 to communicate data to the endpoint device 104 can include, without limitation: amplitude, frequency, phase, polarization, angle, pulse width, duty cycle, color, and so on.

In some examples, data communicated by the source device 102 to the endpoint device 104 can be encoded according to a particular schema (e.g., code division; time division; quadrature modulation; phase shift keying; frequency-shift keying; amplitude-shift keying; pulse code modulation; and so on) and/or may be encrypted. In other examples, the data communicated by the source device 102 to the endpoint device 104 can conform to a particular data transfer protocol—whether proprietary or standardized—such as, but not limited to: universal serial bus (typically referred to as "USB"); peripheral component interconnect express standard (typically referred to as "PCIe"); controller area network (typically referred to as "CAN"); on-board diagnostics (typically referred to as "ODB" or "ODB-II"); serial peripheral interface bus (typically referred to as "SPI Bus"); high-definition multimedia interface (typically referred to as "HDMI"); ethernet; integrated drive electronics (typically referred to as "IDE"); serial or parallel advanced technology attachment (typically referred to as "SATA" or "PATA"); inter-integrated circuit bus (typically referred to as "I2C"); and so on. In other cases, more than one protocol, encoding, and/or encryption technique or technology can be used in parallel.

The data communicated by the source device 102 to the endpoint device 104 can be any suitable data or data type including but not limited to: real-time data; data streams; data files; configuration files; encryption keys; messages; media files or streams; local or remote network resources or addresses; synchronization data; firmware; software; networking data; human interface device and/or sensor data streams or configurations; and so on. In other cases, data communicated by the source device 102 to the endpoint device 104 can be associated with a secure shell or other remote login session. In other cases, data communicated by the source device 102 to the endpoint device 104 can be associated with a serial data link or serial connection between the source device 102 and the endpoint device 104. In still further examples, other data or data types—or combinations of data or data types—can be communicated from the source device 102 to the endpoint device 104.

Figure 1B:
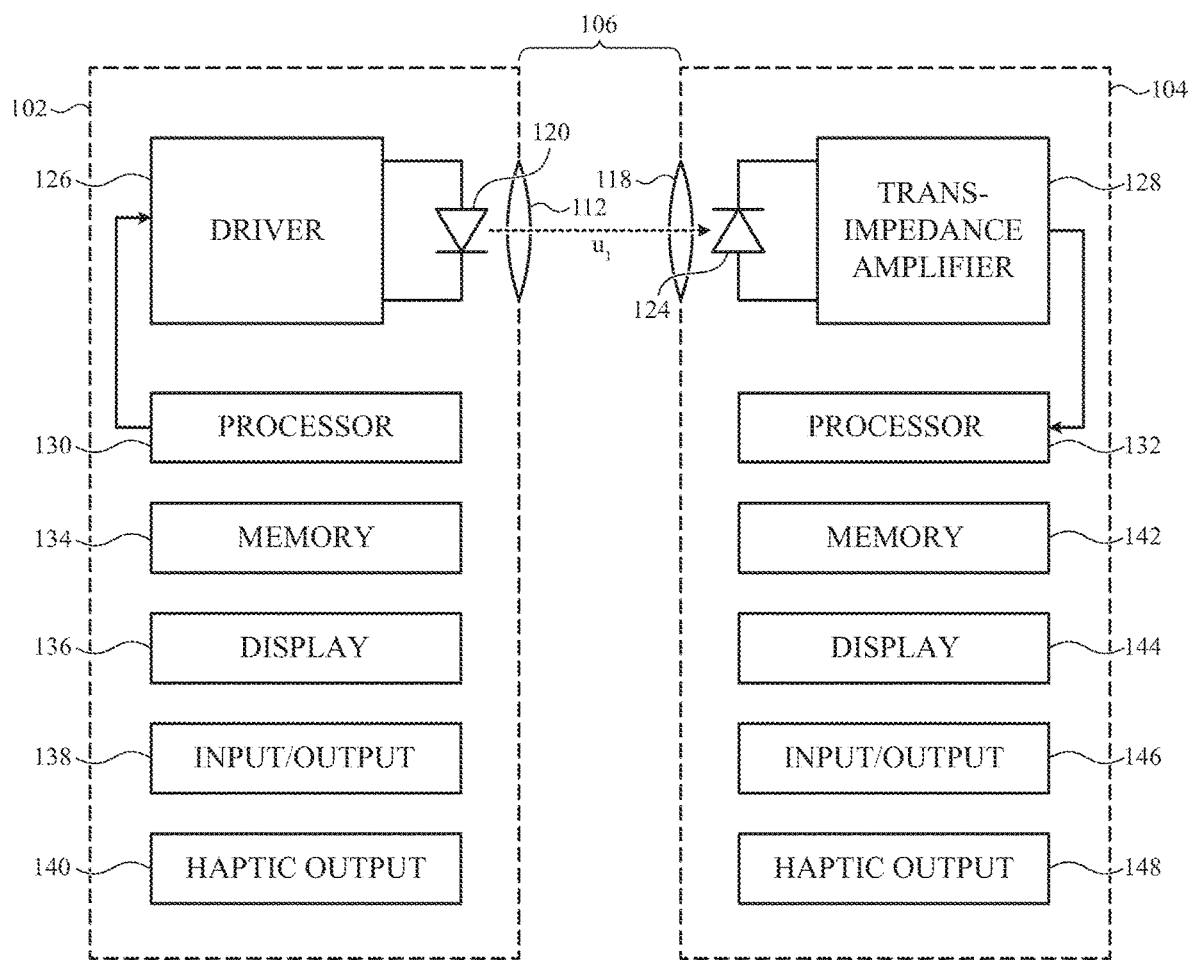
FIG. 1B is a simplified system diagram of the directional free-space optical communication system of FIG. 1A.

It may be appreciated that the foregoing description of FIG. 1A, and the various alternatives thereof and variations thereto are presented, generally, for purposes of explanation, and to facilitate a thorough understanding of various possible configurations of a directional free-space optical communication system, such as described herein. However, it will be apparent to one skilled in the art that some of the specific details presented herein may not be required in order to practice a particular described embodiment, or an equivalent thereof. For simplicity of description and illustration, FIG. 1B is provided. This figure depicts a simplified block diagram of the source device 102 and the endpoint device 104 of FIG. 1A, showing various operational and/or structural components that can be included in certain embodiments.

FIG. 1B depicts a simplified system diagram of the directional free-space optical communication system 100 of FIG. 1A. As show in the figure, the source device 102 includes a laser diode 116 that emits the beam of light $u_1$ toward the endpoint device 104 in order to illuminate a photodiode 118 to communicate data to the endpoint device 104.

The source device 102 can (optionally) include an optical structure 120 to adjust one or more characteristics of the beam of light $u_1$ as it exits the source device 102. As noted above, the optical structure 120 can be configured to spread and/or otherwise increase a cross-sectional area of the beam of light $u_1$ in order to accommodate a greater range of positional and/or angular offset(s) of the endpoint device 104 (see, e.g., FIGS. 2A-3).

Similarly, the endpoint device 104 can (optionally) include an optical structure 122 to further adjust one or more characteristics of the beam of light $u_1$ before the beam of light $u_1$ illuminates the photodiode 118. Example characteristics of a beam of light that can be modified by an optical structure, such as described herein, are non-exhaustively provided above. Non-exhaustive example optical structures that can be included in a source device are described below in reference to FIG. 3. Non-exhaustive example optical structures that can be included in an endpoint device are described below in reference to FIGS. 3-5C.

The laser diode 116 of the source device 102 is coupled to a drive circuit, identified as the drive circuit 124. The drive circuit 124 can be any suitable analog or digital circuit or purpose-configured processor, or combination thereof configured to generate direct current and/or alternating current signals suitable to drive the laser diode 116 to emit laser light. The drive circuit 124 is typically configured to control a level of current circulated through the laser diode 116, although this may not be required; other embodiments may control a voltage applied across the laser diode 116. The drive circuit 124 can apply any suitable current or voltage waveform to cause the laser diode 116 to emit laser light in any suitable manner (e.g., pulse width, duty cycle, color, frequency, amplitude, and so on). The laser light may be monochromatic or polychromatic. The laser diode 116 may be a single mode or a multi-mode laser. As may be appreciated, the waveform applied to the laser diode 116 corresponds to the data to be communicated from the source device 102 to the endpoint device 104 and will accordingly vary from embodiment to embodiment and will be based on the content of the data to be communicated.

The source device 102 can also include other components, including a processor 126, a memory 128, a display 130, an input/output system 132, a haptic output device 134, and so on.

In many configurations, the processor 126 of the source device 102 can be configured to access and execute instructions stored the memory 128 in order to instantiate any number of suitable classes, objects, virtual machines, threads, pipelines, and/or routines to perform, monitor, and/or coordinate one or more operations of the source device 102. Further, the processor 126 can be communicably coupled—either directly (e.g., via general-purpose input/output pins) or indirectly (e.g., via an intermediary circuit or integrated circuit)—to each of the hardware components of the source device 102, including the display 130, the input/output system 132, the haptic output device 134, and the drive circuit 124. In this manner, the processor 126 can coordinate the operation of the various hardware components of the source device 102.

As one example, the processor 126 can cause the display 130 to render a user interface while monitoring a user input sensor (e.g., capacitive touch sensor, capacitive force sensor, and so on) of the input/output system 132 to detect one or more characteristics of a user's physical interaction with the display 130. As a result of this construction, a user of the source device 102 is encouraged to interact with content shown on the display 130. In response to specific user interactions and/or specific events, the processor 126 can cause the haptic output device 134 to generate a haptic feedback that can be felt by the user.

The photodiode 118 of the endpoint device 104 is coupled to amplifier 136. In many embodiments, the amplifier 136 is a transimpedance amplifier, but this may not be required of all embodiments. As with the drive circuit 124 of the source device 102, the amplifier 136 can be any suitable analog or digital circuit or purpose-configured processor, or combination thereof. The amplifier 136 is typically configured to convert a level of current circulated through the photodiode 118 to a corresponding level of voltage, although this may not be required.

In some examples, the amplifier 136 is coupled to a multi-bit analog-to-digital converter (not shown) to quantize the level of voltage output from the amplifier 136 into a series of digitally represented values.

In other cases, the amplifier 136 can be coupled to a single-bit analog-to-digital converter or a limiting amplifier configured to generate a sequence of voltages that correspond to digital data (e.g., ones and zeros). In other words, an output of the amplifier 136 can be coupled to an input (e.g., a gate) of a high-speed switching element (e.g., diode, transistor, and so) in order to quantize the voltage output from the amplifier 136 as either a binary one or a binary zero.

In still other examples, the amplifier 136 can be coupled to a buffer and/or shift register configured to convert serial information received from the source device into a parallel data.

In still further examples, the output from amplifier 136 can be provided directly (with or without a resistor or other elements in series, such as a high-pass filter) to an input of a digital circuit for further processing. As may be appreciated, the waveform output from the photodiode 118 corresponds to the data to be communicated from the source device 102 to the endpoint device and will accordingly vary from embodiment to embodiment and will be based on the content of the data communicated to the endpoint device.

Similar to the source device 102 described above, the endpoint device 104 can also include other components, including a processor 138, a memory 140, a display 142, an input/output system 144, a haptic output device 146, and so on.

Similar to the processor 126 of the source device 102 described above, in many configurations, the processor 138 of the endpoint device 104 can be configured to access and execute instructions stored the memory 140 in order to instantiate any number of suitable classes, objects, virtual machines, threads, pipelines, and/or routines to perform, monitor, and/or coordinate one or more operations of the endpoint device 104. Further, the processor 138 can be communicably coupled—either directly (e.g., via general-purpose input/output pins) or indirectly (e.g., via an intermediary circuit or integrated circuit)—to each of the hardware components of the endpoint device 104, including the display 142, the input/output system 144, the haptic output device 146, and the amplifier 136. In this manner, the processor 138 can coordinate the operation of the various hardware components of the endpoint device 104 in a manner similar to that described above in reference to the processor 126 of the source device 102.

Accordingly, generally and broadly in view of FIGS. 1A-1B, it is understood that a directional free-space optical communication system can be configured in a number of ways. For example, as noted above, certain electronic devices can operate as both a source device and an endpoint device. In this manner, two-way optical communication can be achieved. Further, in certain embodiments, a source device can include more than one laser diode and an endpoint device can include more than one photodiode. In this manner, multi-channel optical communication can be achieved.

Further, although the illustrations of FIG. 1A-1B depict optical communication modules as purpose-configured components, this may not be required. For example, in some embodiments, a display or other light source of a source device can be used to transmit data using the techniques and methods described herein. Similarly, a camera or a proximity sensor of an endpoint device can be used to receive data using the techniques and methods described herein.

Further, it is appreciated that the specific configuration(s) shown in FIGS. 1A-1B are not required. In other cases, a laser diode of a source device and/or a photodiode of an endpoint device can be disposed in different portions of an electronic device housing.

Additionally, it may be appreciated that other components and/or systems may be included in particular embodiments. For example, as noted above, in some examples, light emitted from a laser diode of a source device can be configured to conform to a standardized data transfer protocol, such as PCIe. In these embodiments, the endpoint device may include one or more circuits, processors, or components configured to route the information received from the source device directly to a component or subsystem of the endpoint device that responds to the standardized protocol. In this manner, a processor in the source device can directly access and/or control a resource of the endpoint device via the directional free-space optical communication system.

In one implementation of this example, two mobile phones can be optically coupled. As a result of the coupling, a processor in the first mobile phone can directly access a serial or PCIe interface of a camera in the second mobile phone in order to stream images from that camera back to the first mobile phone. As a result of this construction, the first mobile phone receives image data from the second mobile phone's camera in substantially real-time, avoiding delays associated with conventional image streaming techniques such as transcoding, compression, formatting, and so on. In another implementation of this example, a mobile phone and a laptop device can be optically coupled. As a result of the coupling, a processor in the laptop device can directly access a PCIe interface of a memory in the mobile phone in order to access data stored therein. As a result of this construction, the laptop device can copy and/or synchronize data from the mobile phone's memory in substantially real-time.

In yet another example implementation of this example, two laptop computing devices can be optically coupled. As a result of the coupling, a processor in the first laptop computing device can directly communicate with a processor in the second laptop computing device. As a result of this construction, the two laptop devices can cooperate to process one or more tasks in parallel.

Thus, it is understood that the foregoing descriptions of specific embodiments are presented for the purposes of illustration and description. These descriptions are not exhaustive nor intended to limit the disclosure to the precise forms recited herein. To the contrary, it will be apparent to one of ordinary skill in the art that many modifications and variations are possible in view of the above teachings.

For example, in many embodiments, alignment between a source device and an endpoint device may not be guaranteed. FIGS. 2A-2D depict a simplified representation of a directional free-space optical communication system 200 in which a source device 202 and an endpoint device 204 are movable and separated by an air gap 206. As with other embodiments described herein, a beam of light $u_1$ emitted from a laser diode in the source device 202 propagates through the air gap 206 along a line-of-sight path toward the endpoint device 204 to illuminate a photodiode in the endpoint device 204.

In many cases, the endpoint device 204 may be movable relative to the source device 202. In the illustrated embodiment, six axes of potential movement are shown including three translational axes and three rotational axes. More specifically, the endpoint device 204 can move—relative to the source device 202—in three-dimensional space in an X-direction (e.g., to the left or to the right of the source device 202; see, e.g., FIG. 2B), in a Y-direction (e.g., toward or away from the source device 202; see, e.g., FIG. 2C), and/or in a Z-direction (e.g., above or below the source device 202; see, e.g., FIG. 2D). Similarly, the endpoint device 204 can rotate about the Y-direction axis to an angle $\Phi$ (e.g., roll; see, e.g., FIG. 2D), about the X-direction axis to an angle $\Theta$ (e.g., pitch; see, e.g., FIG. 2C), and/or about the Z-direction axis to an angle $\Psi$ (e.g., yaw; see, e.g., FIG. 2B).

To account for variations in alignment between a source device and an endpoint device of a directional free-space optical communication system, many embodiments optically couple one or more passive or active optical structures or elements—such as reflectors, lenses, optical adapters, and so on—to either or both the laser diode in a source device or the photodiode in an endpoint device.

Figure 3:
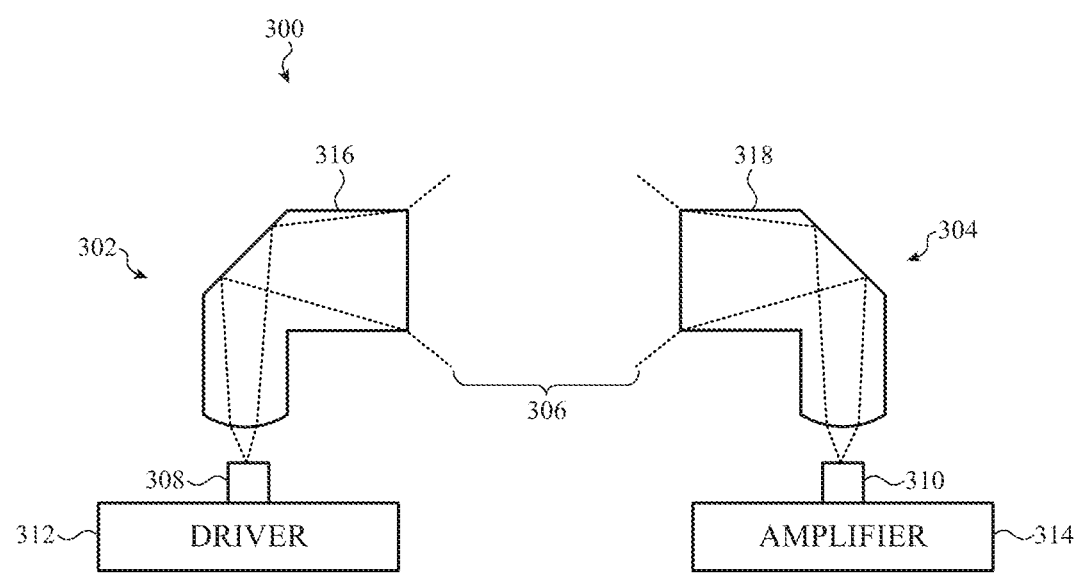
FIG. 3 depicts a system diagram of a directional free-space optical communication system, such as described herein.

FIG. 3 depicts a system diagram of a directional free-space optical communication system 300. As with other embodiment described herein, the system includes a source device 302 and an endpoint device 304 that are separated by an air gap 306. The source device 302 includes a laser diode 308 and the endpoint device 304 includes a photodiode 310. The laser light output from the laser diode 308 is modulated and/or otherwise controlled according to a selected data signal or waveform by a drive circuit 312. In the endpoint device 304, the photodiode 310 is electrically coupled to an amplifier 314 that may be a transimpedance amplifier configured convert current output from the photodiode 310 into a variable voltage. In some embodiments, the amplifier 314 also provides a reverse bias to the photodiode 310 so that the photodiode 310 operates in a photoconductive mode and not a photovoltaic mode.

In many embodiments, the drive circuit 312 of the source device 302 is formed onto a semiconductor substrate that provides both mechanical support and electrical connection to the laser diode 308. The drive circuit 312 of the source device 302 can be implemented and/or fabricated in a number of suitable ways. In some examples, the drive circuit 312 and the laser diode 308 are fabricated in the same process or operation, but this may not be required. In some embodiments, the drive circuit 312 may be positioned off-board from a rigid substrate or flexible circuit board to which the laser diode 308 is coupled. It may be appreciated that the simplified layout shown in FIG. 3 is merely one example and that many other implementations and circuit topologies may be possible.

Similarly, the amplifier 314 of the endpoint device 304 can be formed onto a semiconductor substrate that provides both mechanical support and electrical connection to the photodiode 310. As with the drive circuit 312 of the source device 302, the amplifier 314 of the endpoint device 304 can be implemented and/or fabricated in a number of suitable ways. In some examples, the amplifier 314 and the photodiode 310 are fabricated in the same process or operation, but this may not be required. In some embodiments, the amplifier 314 may be positioned off-board from a rigid substrate or flexible circuit board to which the photodiode 310 is coupled. As noted above, it may be appreciated that the simplified layout shown in FIG. 3 is merely one example and that many other implementations and circuit topologies may be possible.

The source device 302 also includes an optical adapter 316 configured to reflect and/or diverge a laser light beam emitted from the laser diode 308, thereby increasing the beam width, divergence angle, and/or beam cross-section by a certain designed amount. In other cases, other beam parameters can be adjusted by the optical adapter 316. In the illustrated embodiment, the optical adapter 316 also redirects the laser light beam emitted from the laser diode 308 ninety degrees, although this may not be required and/or may vary from embodiment to embodiment.

It may be appreciated, however, that diverging and/or redirecting the beam output from the laser diode 308 beyond a threshold amount may be undesirable and may contribute to losses. Accordingly, for embodiments described herein, the optical adapter 316 of the source device 302 is typically configured to modify one or more characteristics of the beam output from the laser diode 308 in order to increase positional and angular offset tolerance of the optical communication system without increasing losses beyond a certain selected threshold amount, which may vary from embodiment to embodiment.

In the illustrated embodiment, the endpoint device 304 can also include an optical adapter 318 configured to reflect and/or concentrate the laser light beam emitted from the laser diode 308 onto the photodiode 310, thereby increasing the quantity of light (e.g., quantity of photons) received by the photodiode 310. In the illustrated embodiment, similar to the optical adapter 316 described above, the optical adapter 318 also redirects the laser light beam emitted from the laser diode 308 ninety degrees, although—as noted above—this may not be required and/or may vary from embodiment to embodiment. It may be appreciated that, by concentrating the laser light beam in this manner, the optical adapter 318 of the endpoint device 304 also servers to increase positional and angular offset tolerance of the optical communication system. In other words, in some embodiments, as a result of the wider area across which light is collected by the endpoint device 304, the photodiode 310 of the endpoint device 304 can remain illuminated by the laser light beam emitted from the laser diode 308 even if the endpoint device 304 is offset from the source device 302 by a small amount.

In many embodiments, the optical adapter 316 and the optical adapter 318 are made from the same material, but this may not be required. Example materials for the optical adapter 316 and the optical adapter 318 can include, but may not be limited to flexible or rigid: optically clear polymers; glass; optically-clear ceramics; plastics; and so on. In some cases, the optical adapter 316 and/or the optical adapter 318 can be treated with an optically reflective outer coating, such as a mirrored or metallic coating. In other cases, other appropriate surface finishes and/or external layers can be added.

Furthermore, although the optical adapter 316 and the optical adapter 318 are illustrated as above, and separated from the laser diode 308 and the photodiode 310, respectively, it may be appreciated that this configuration may not be required of all embodiments. For example, in one embodiment, the optical adapter 316 may be optically coupled to an outer surface of the laser diode 3089 via an optically clear adhesive. In this case, the optically clear adhesive may be selected to provide a more gradual refractive index transition from the laser diode 308 to the optical adapter 316; the optically clear adhesive may be selected to have a refractive index between that of the optical adapter 316 and the laser diode 308. It may be appreciated that the photodiode 310 and the optical adapter 318 may be similarly configured.

In other embodiments, additional optical adapters, lenses, and/or reflectors can be included. For example, in some embodiments, the optical adapter 316 can be optically coupled to the laser diode 308 via a second optical adapter (e.g., a fiber optic cable). In other cases, one or more lenses (e.g., concave, convex, Fresnel, and so on) can interpose the laser diode and the optical adapter 316. It may be appreciated that the photodiode 310 and the optical adapter 318 may be similarly configured.

In some embodiments, the endpoint device can include additional and/or alternative optical structures to further increase the quantity of light received by the photodiode. Generally and broadly, FIGS. 4A-4G each depict various implementations of an optical adapter having a shape that tapers toward the photodiode. As a result of this construction, the optical adapter serves to "funnel" light toward the photodiode, thereby increasing the quantity of light illuminating the photodiode at a particular time. In these embodiments, generally and broadly, the taper can be defined by an angle $\beta$. The angle $\beta$ can vary from embodiment to embodiment but in many examples, the angle $\beta$ is selected to be above that of the critical angle of the material forming the tapered optical adapter.

Figure 4A:
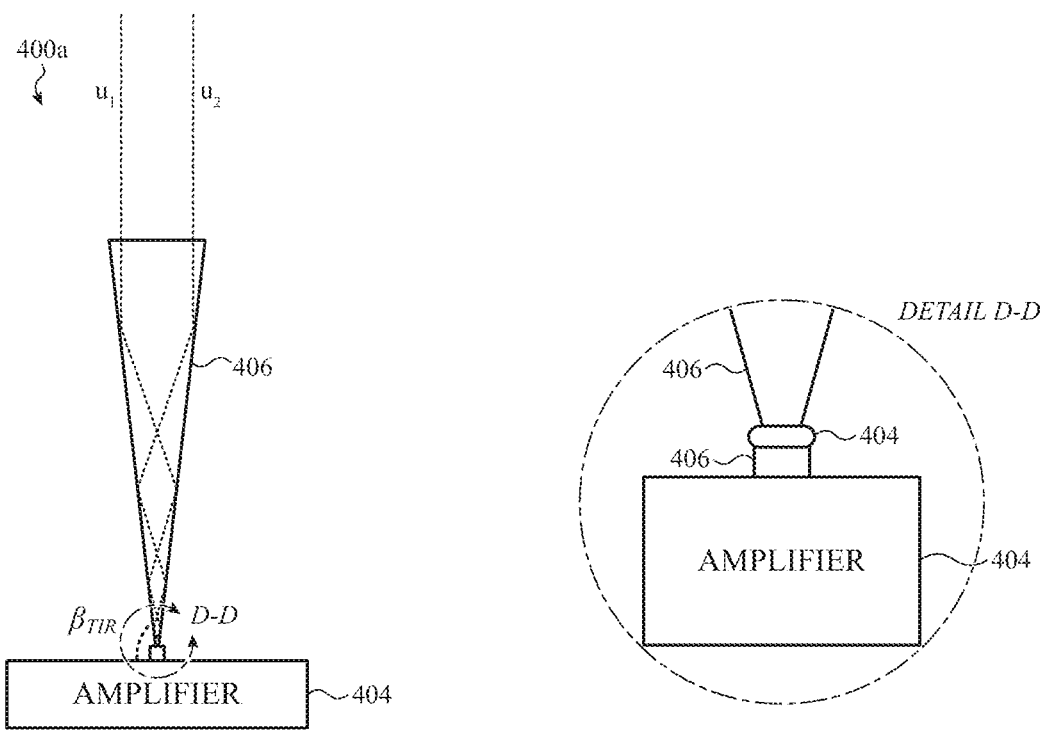
FIG. 4A depicts an example optical adapter—and an offset detail view of the same—optically coupled to a photodiode, such as described herein.

FIG. 4A depicts an endpoint device 400a that, like many embodiments described herein, includes a photodiode 402 disposed on a substrate including an amplifier 404. The photodiode 402 is positioned below an optical adapter 406. The optical adapter 406 is coupled to the photodiode 402 via an optically clear adhesive 408 or other index-matching optical material, such as an index-matching optical gel.

In this embodiment, the optical adapter 406 takes the shape of an inverted conical frustum which can be characterized by a small-radius face (optically coupled to the photodiode 402), a large-radius face opposite the small-radius face, and a lateral face or sidewall that connects the small-radius face and the large-radius face. As shown in FIG. 4A, the lateral face of the conical frustum is defined by an angle $\beta$, which is greater than or at least equal to the critical angle for total internal reflection within the optical adapter 406.

As a result of the angle $\beta$, light entering the optical adapter 406 along a path that is substantially parallel to, but offset from, a normal vector of the photodiode 402 is reflected one or more times off the internal surface(s) of the optical adapter 406, coercing that light toward the photodiode 402 (see, e.g., the beams of light $u_1$ and $u_2$).

Phrased more simply, the optical adapter 406 effectively increases the photosensitive area of the photodiode 402 to the area of the large-radius face of the optical adapter 406. This construction allows the photodiode 402 to be illuminated by a larger cross-sectional area of light without physically increasing the size of the photosensitive area of the photodiode 402 which, as noted above, may undesirably increase rise times and fall times, reducing the speed and responsiveness of the photodiode 402.

Also as a result of this construction, the optical adapter 406 allows for increased spatial offset in at least the X-direction and Z-direction (see, e.g., FIGS. 2A-2D) between an endpoint device and a source device.

In many embodiments, the small-radius face of the optical adapter 406 has a radius that is approximately equal to a radius of the photosensitive area (not shown) of the photodiode 402. For example, if the photodiode 402 has a circular shape with a radius of approximately 40 µm, the small-radius face of the optical adapter 406 may be approximately 40 µm.

The optical adapter 406 can be constructed in a number of ways, and may take a variety of shapes that can vary from embodiment to embodiment. For example, increasing the size of the large-radius face of the optical adapter 406 (e.g., effectively increasing the height of the optical adapter) may allow for additional light to be collected, but, due to the requirement that the lateral edge is formed at the angle β, such an optical adapter may exhibit greater sensitivity to angular offset between the endpoint device and the source device. In other words, if increased spatial offset tolerance is required or preferred for a particular embodiment, the optical adapter may be increased in height.

Figure 2A:
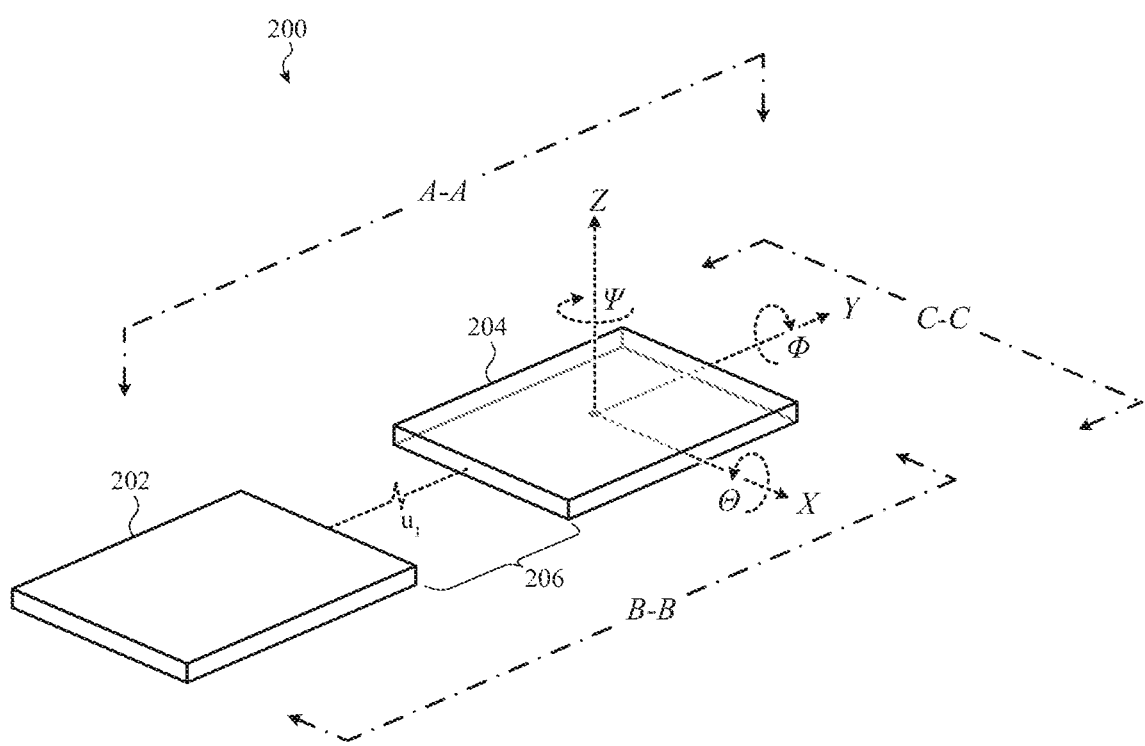
FIG. 2A depicts a simplified representation of a source device and an endpoint device, collimated relative to one another.
Figure 2B:
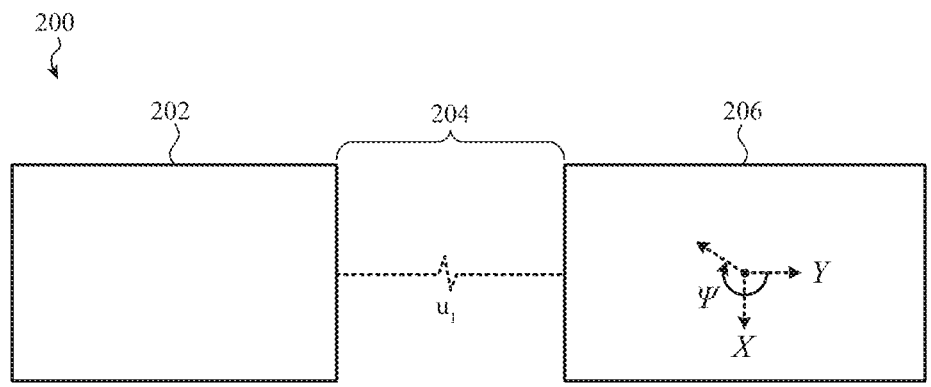
FIG. 2B depicts the simplified representation of the collimated devices of FIG. 2A, viewed along line A-A.
Figure 2C:
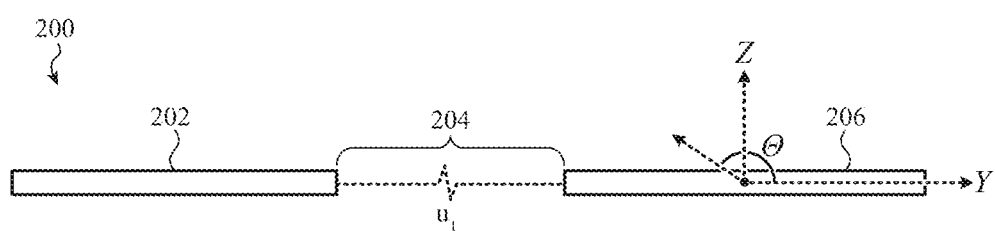
FIG. 2C depicts the simplified representation of the collimated devices of FIG. 2A, viewed along line B-B.
Figure 2D:
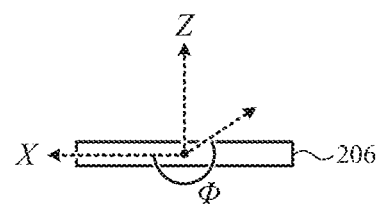
FIG. 2D depicts the simplified representation of the collimated devices of FIG. 2A, viewed along line C-C.

Conversely, decreasing the size of the large-radius face of the optical adapter 406 (e.g., reducing the height of the optical adapter) may collect less light, but, in turn, may collect light from a greater range of angles (see, e.g., FIGS. 2B-2D). As such, if increased angular offset tolerance is required or preferred for a particular embodiment, the optical adapter may be decreased in height.

Figure 4B:
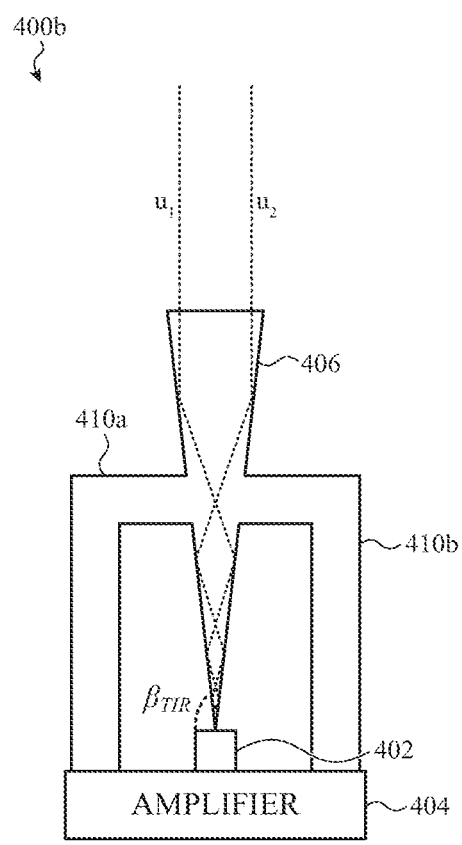
FIG. 4B depicts another example optical adapter optically coupled to a photodiode, such as described herein.

In other embodiments, an optical adapter suitable for an endpoint device of a directional free-space optical communication system can be implemented in another manner. For example, FIG. 4B depicts another endpoint device, identified as the endpoint device 400b that, like many embodiments described herein, includes a photodiode 402 disposed on a substrate including an amplifier 404. As with the embodiment depicted in FIG. 4A, the photodiode 402 is positioned below an optical adapter 406. The optical adapter 406 is (optionally) coupled to the photodiode 402 via an optically clear adhesive (not shown) and may function and be configured in the same manner(s) as described above in reference to FIG. 4A.

In this example embodiment, the optical adapter 406 is formed with and as a self-supporting structure, including the supports 410a and 410b extending from a body of the optical adapter 406 and coupling the optical adapter 406 to the amplifier substrate in a suitable manner (e.g., adhesive, heat staking, formed or molded into undercuts defined in the substrate, and so on).

The supports 410a and 410b can take any suitable size or shape. In one embodiment, the supports 410a and 410b extend around and entirely or partially enclose the photodiode 402 in a volume that may or may not be filled with a material. In some cases, the volume may be sealed.

In other embodiments, the supports 410a and 410b can have a curved or triangular shape; it may be appreciated that any suitable shape, size, and position of the supports 410a and 410b relative to the body of the optical adapter 406 is contemplated.

In yet other embodiments, an optical adapter suitable for an endpoint device of a directional free-space optical communication system can be included—partially or entirely—in a cover or protective outer layer of an enclosure that protects at least a portion of the endpoint device and/or a portion of an optical communication module incorporated into an endpoint device. In other words, certain embodiments can incorporate an optical adapter into a housing of an electronic device (e.g., the endpoint device), whereas other embodiments can incorporate an optical adapter into a component enclosure protecting an optical communication module that, in turn, is incorporated into a housing of an electronic device. For these embodiments, the optical adapter can be formed into and/or defined into a larger body of material. As a result of this construction, the optical adapter can have increased strength and/or resilience and may be more durable in use.

Generally and broadly, FIGS. 4C-4G depict various implementations of an optical adapter that is incorporated into a transparent portion of a housing of an electronic device or a transparent portion of a component enclosure.

Figure 4C:
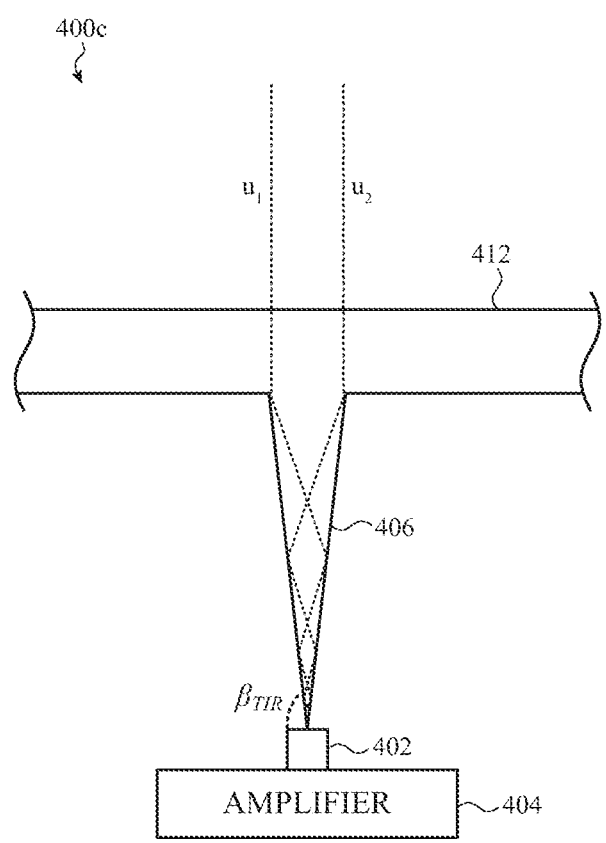
FIG. 4C depicts another example optical adapter optically coupled to a photodiode, such as described herein.

For example, FIG. 4C depicts another endpoint device, identified as the endpoint device 400c that, like many embodiments described herein, includes a photodiode 402 disposed on a substrate including an amplifier 404. As with the embodiments depicted in FIGS. 4A-4B, the photodiode 402 is positioned below an optical adapter 406. The optical adapter 406 can be coupled to the photodiode 402 via an optically-clear adhesive (not shown) and may function and be configured in the same manner(s) as described above in reference to FIGS. 4A-4B.

In this embodiment, the optical adapter 406 extends from a transparent substrate layer, identified as the substrate 412. In some cases, the optical adapter 406 and the substrate 412 are formed from the same material and/or in the same process, but this may not be required. For example, in some cases, the optical adapter 406 may be adhered to an interior surface of the substrate 412 via an optically clear adhesive. In other cases, the optical adapter 406 can be formed onto the interior surface of the substrate 412 using a suitable technique.

The substrate 412 can be formed from any number of suitable materials or material combinations. In one embodiment, the substrate 412 is formed from glass and defines at least a portion of an exterior surface of an electronic device housing (or component enclosure. In another embodiment, the substrate 412 is formed from plastic or another polymer material and defines at least a portion of an exterior surface of an electronic device housing (or component enclosure).

The substrate 412 can have any suitable thickness. In some embodiments, the thickness of the substrate 412 may be substantially larger than depicted (see, e.g., FIG. 5B). Further, although depicted as a planar and/or flat material, the substrate 412 of certain embodiments is not so constrained; in some cases, the substrate may be curved or may take an arbitrary shape.

Figure 4D:
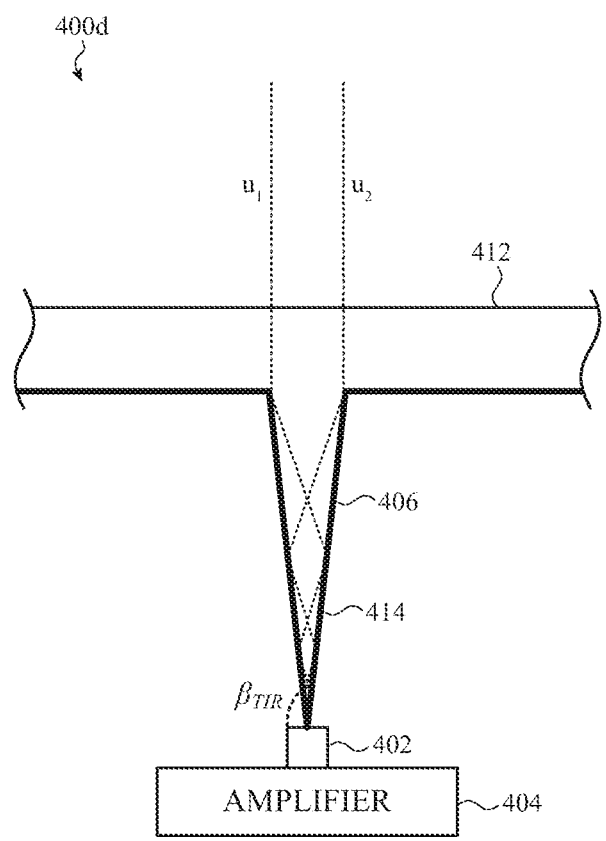
FIG. 4D depicts an example optical adapter with a reflective coating optically coupled to a photodiode, such as described herein.

In some cases, the optical adapter 406 and/or the substrate 412 can be coated with an optically reflective material, such as a metallic material. FIG. 4D shows an embodiment in which a reflective coating is disposed onto an exterior surface of the optical adapter 406 and the substrate 412. The reflective layer 414 is typically not disposed over the portion of the optical adaptor 406 interfacing the photodiode 402, but this may not be required. For example, in some embodiments, the reflective layer 414 may be formed from the same metallic or semiconductor material of the photodiode 402. In other words, the reflective layer 414 can serve, in whole or in part, as a photosensitive area of the photodiode 402.

As noted above, the reflective layer 414 can be made of a metallic material or can be made from a multi-layer dielectric material. It may be appreciated that embodiments incorporating the reflective layer 414 may exhibit increased angular offset tolerance. Further, it may be appreciated that embodiments incorporating the reflective layer 414 may not necessarily require that the optical adapter 406 follow the angle β; shallower angles maybe suitable due to presence of the reflective layer 414.

Figure 4E:
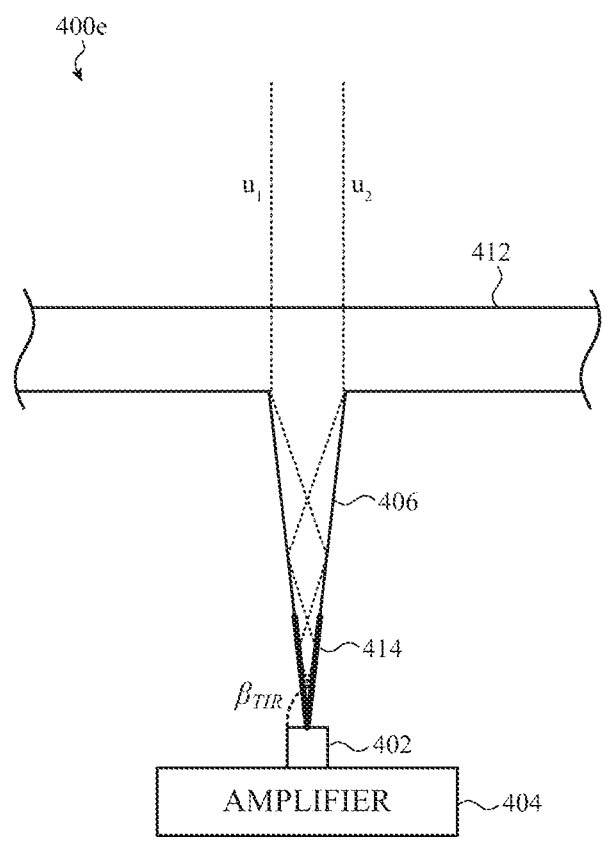
FIG. 4E depicts another example optical adapter with a reflective coating optically coupled to a photodiode, such as described herein.

In other embodiments, the reflective layer 414 may not necessarily be disposed over the entire optical adapter. For example, as shown in FIG. 4E, the optical adapter 406 includes a reflective layer 414 only adjacent to the photodiode 402. As with the embodiment described above in reference to FIG. 4D, the reflective layer 414 as shown in FIG. 4E is typically not disposed over the portion of the optical adaptor 406 interfacing the photodiode 402, but this may not be required. For example, in some embodiments, the reflective layer 414 may be formed from the same metallic or semiconductor material of the photodiode 402. In other words, the reflective layer 414 can serve, in whole or in part, as a photosensitive area of the photodiode 402.

Figure 4F:
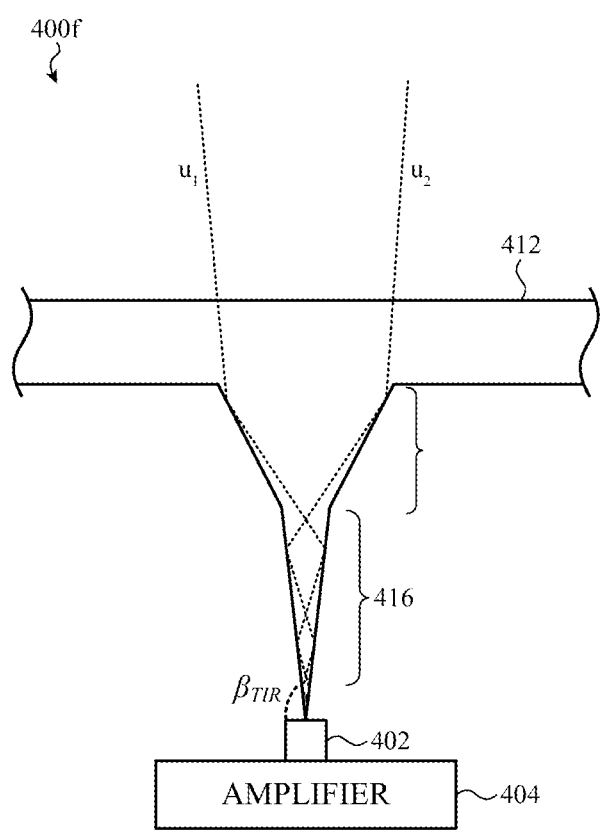
FIG. 4F depicts another example optical adapter optically coupled to a photodiode, such as described herein.
Figure 4G:
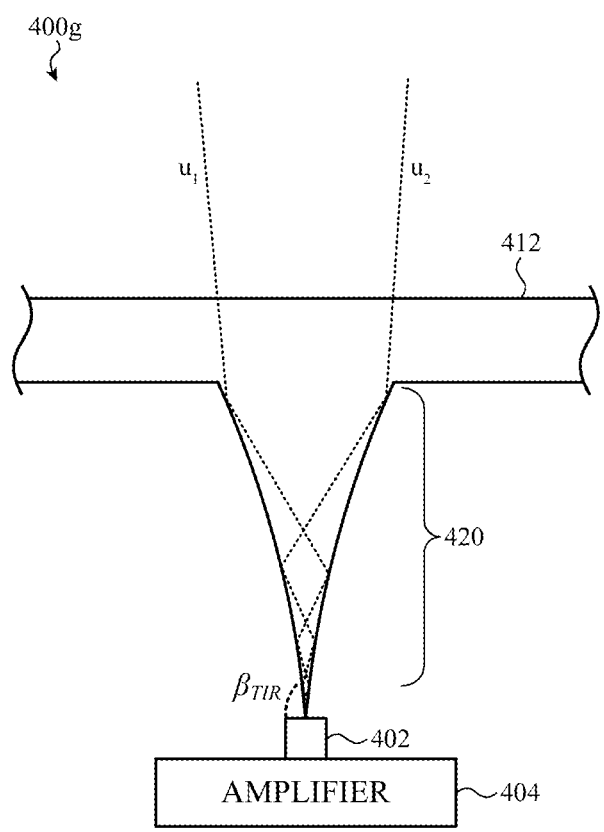
FIG. 4G depicts another example optical adapter optically coupled to a photodiode, such as described herein.

In still other embodiments, an optical adapter may not require a constant angle. For example, as shown in FIG. 4F, an optical adapter can be formed from multiple angled sections. In the illustrated embodiment, a first angled section 416 can extend from a second angled section 418. It may be appreciated that embodiments incorporating the multiple angled sections may exhibit increased angular offset tolerance. In still further embodiments, an optical adapter, such as described herein, can have a continuous or substantially continuous profile, such as shown in FIG. 4G. In this embodiment, the optical adapter has a curved or flared profile, identified as the optical adapter 420. As with the embodiment depicted in FIG. 4F, the optical adapter 420 may exhibit increased angular offset tolerance.

It may be appreciated that the foregoing description of FIGS. 4A-4G, and various alternatives thereof and variations thereto are presented, generally, for purposes of explanation, and to facilitate a thorough understanding of various possible configurations of an optical adapter suitable for an endpoint device of a directional free-space optical communication system, such as described herein. However, it will be apparent to one skilled in the art that some of the specific details presented herein may not be required in order to practice a particular described embodiment, or an equivalent thereof.

Thus, it is understood that the foregoing descriptions of specific embodiments are presented for the purposes of illustration and description. These descriptions are not exhaustive nor intended to limit the disclosure to the precise forms recited herein. To the contrary, it will be apparent to one of ordinary skill in the art that many modifications and variations are possible in view of the above teachings.

Generally and broadly, FIGS. 5A-5E each depict an additional implementations of an optical adapter suitable for an endpoint device of a directional free-space optical communication system, such as described herein. In these embodiments, a convex lens can be positioned above the optical adapter in order to increase the angular offset tolerance of the endpoint device. More specifically, a lens, such as described herein, can be configured to collect and/or focus light over a larger area, thereby increasing one or both spatial and/or angular offset tolerance.

Figure 5A:
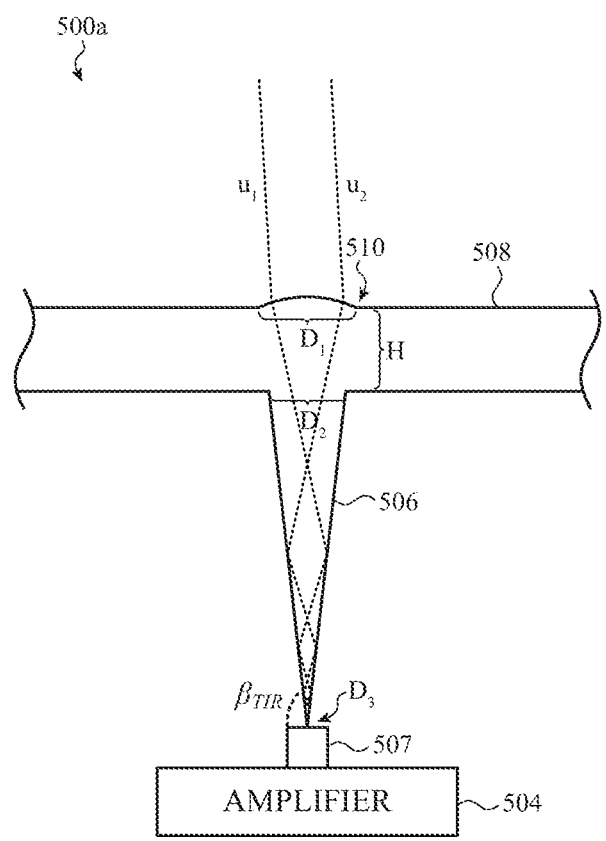
FIG. 5A depicts an example optical adapter with an integrated lens and optically coupled to a photodiode, such as described herein.

FIG. 5A depicts an endpoint device 500a that, like many embodiments described herein, includes a photodiode 502 disposed on a substrate including an amplifier 505. The photodiode 502 is positioned below an optical adapter 506 that, similar to embodiments described above, can extend from—and/or may be formed integrally with—a substrate 508. The substrate 508 may form a portion of an electronic device housing and/or a portion of a component enclosure.

The illustrated embodiment also includes a convex lens 510 that protrudes from an exterior surface of the substrate 508 positioned above, and aligned with (in many embodiments), the optical adapter 506. The convex lens 510 is configured to converge light into the body of the substrate 508, directing the converged light toward the optical adapter 506. Once light is within the optical adapter 506, it may be reflected and/or funneled toward the photodiode 507 such as described in reference to other embodiments.

In other embodiments, the convex lens 510 may not necessarily be aligned with the optical adapter 506. Instead, the convex lens 510 may be offset from the optical adapter 506 to impart an angular bias to the endpoint device 500a.

In the illustrated embodiment, similar to embodiments described above, the optical adapter 506 takes the shape of an inverted conical frustum which can be characterized by a small-radius face (optically coupled to the photodiode 502), a large-radius face opposite the small-radius face and positioned below the convex lens 510, and a lateral face or sidewall that connects the small-radius face and the large-radius face. In a typical implementation of this embodiment, the convex lens 510 has a diameter $D_1$ that is larger than a diameter of the large-radius face of the optical adapter 506 (e.g., $D_2$), which, in turn, is larger than a diameter of the small-radius face of the optical adapter 506 (e.g., $D_3$). The diameters of the various portions of the optical adapter 506, including the height and/or thickness of the substrate 508, (e.g., h, see e.g., FIG. 5B) may vary from embodiment to embodiment.

In these examples, the substrate 508 may exhibit greater strength and/or resilience; the endpoint device may be more durable. In some cases, the height of the substrate 508 may be greater than a height of the optical adapter 506.

Figure 5B:
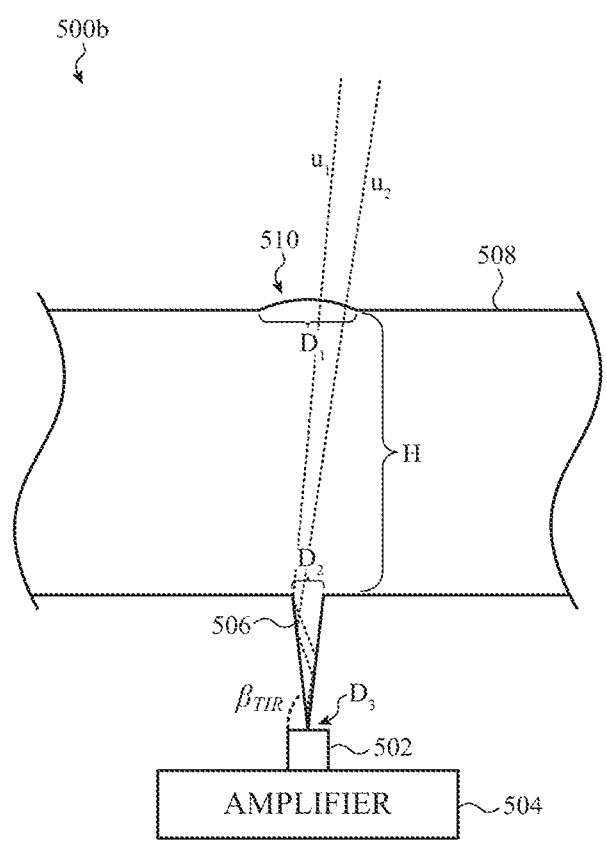
FIG. 5B depicts another example optical adapter with an integrated lens and optically coupled to a photodiode, such as described herein.
Figure 5C:
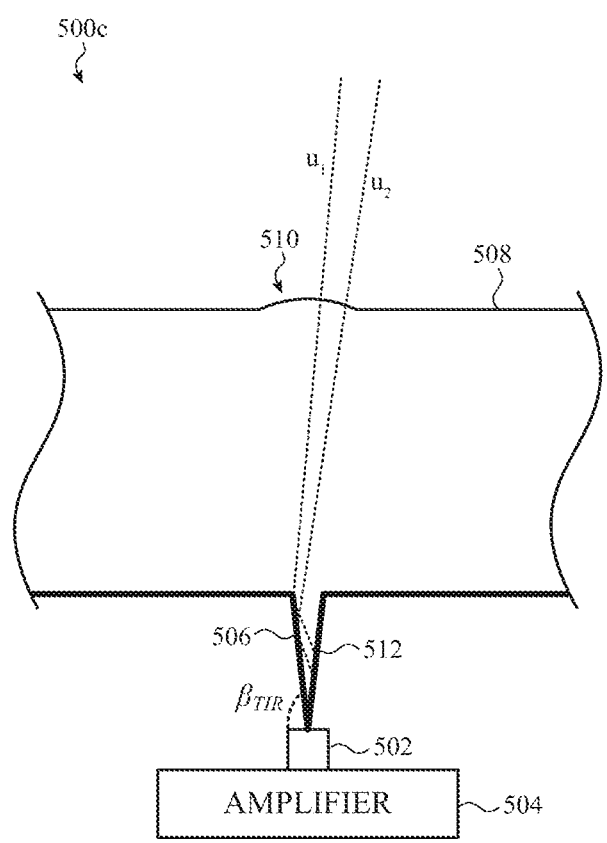
FIG. 5C depicts another example optical adapter with an integrated lens and a reflective coating optically coupled to a photodiode, such as described herein.

In further embodiments, such as shown in FIG. 5C, a reflective coating 512 can be applied. As noted above, the reflective coating 512 can be any suitable reflective coating including, but not limited to: a metallic layer; a multi-layer dielectric coating; and so on.

It may be appreciated that the foregoing description of FIGS. 5A-5C, and various alternatives thereof and variations thereto are presented, generally, for purposes of explanation, and to facilitate a thorough understanding of various possible configurations of an optical structure including a convex lens and an optical adapter suitable for an endpoint device of a directional free-space optical communication system, such as described herein. However, it will be apparent to one skilled in the art that some of the specific details presented herein may not be required in order to practice a particular described embodiment, or an equivalent thereof.

For example, in some cases, the optical adapters as shown in FIGS. 5A-5C can be configured as shown and described in reference to FIGS. 4E-4G. In other words, it may be appreciated that the optical adapters as shown in FIGS. 5A-5C can be implemented with a reflective coating and/or a non-linear profile.

Figure 5D:
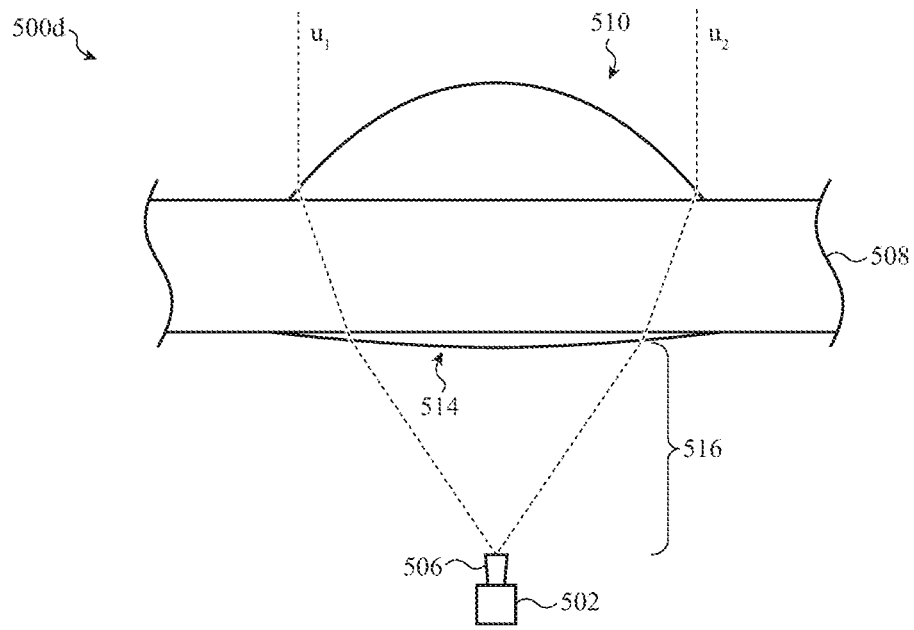
FIG. 5D depicts an example optical adapter separated from a lens by a gap and optically coupled to a photodiode, such as described herein.
Figure 5E:
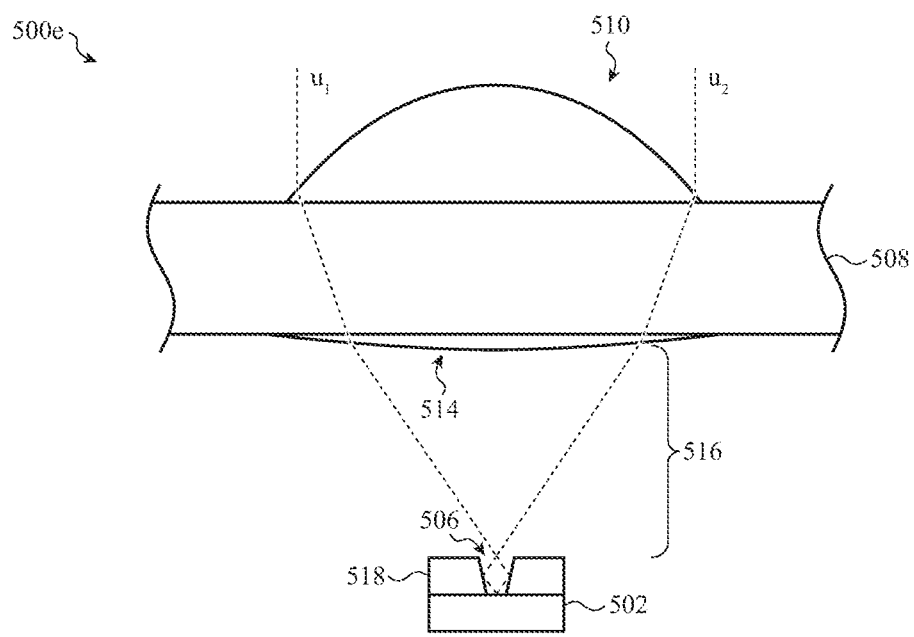
FIG. 5E depicts another example optical adapter separated from a lens by a gap and optically coupled to a photodiode, such as described herein.

Other embodiments can be implemented in another manner. For example, in some cases, an optical adapter such as described herein may not be integrally formed with a lens. FIGS. 5D-5E depict example embodiments in which a lens is separated from an optical adapter by a gap.

FIG. 5D depicts an endpoint device 500d that, like many embodiments described herein, includes a photodiode 502 disposed on a substrate including an amplifier (not shown). As with other embodiments described herein, the photodiode 502 is positioned below an optical adapter 506 that, similar to embodiments described above, can extend from—and/or may be formed integrally with—a substrate 508. The substrate 508 may form a portion of an electronic device housing and/or a portion of a component enclosure.

The illustrated embodiment also includes a convex lens 510 that protrudes from an exterior surface of the substrate 508 positioned above, and aligned with (in many embodiments), the optical adapter 506. The convex lens 510 is configured to converge light through the body of the substrate 508 toward an optional second convex lens 514 (protruding from an interior surface of the substrate 508, opposite and optionally aligned with the convex lens 510) that, in turn, focuses light toward the optical adapter 506. Once light is within the optical adapter 506, it may be reflected and/or funneled toward the photodiode 507 such as described in reference to other embodiments.

As noted with respect to the embodiments described in reference to FIGS. 5A-5C, the convex lens 510 may not necessarily be aligned with the optical adapter 506. Instead, the convex lens 510 may be offset from the optical adapter 506 to impart an angular bias to the endpoint device 500a.

In this embodiment, the substrate 508 is separated from the photodiode 502 by a gap 516. The gap 516 may be an air gap. In some cases, the gap 516 can be filled with an optically clear material such as a gas, liquid, or polymer material. In some cases, the gap 516 can at least partially define a volume held at or near vacuum.

In still other examples, an optical adapter can be defined by a cavity instead of an optically clear material. For example, FIG. 5E depicts an endpoint device 500e that, like many embodiments described herein, includes a photodiode 502 disposed on a substrate including an amplifier (not shown). The photodiode 502 is positioned below an optical adapter 506 that is formed as a cavity or opening an encapsulation material 518 disposed on an outer surface of the photodiode 502. Although the optical adapter 506 is depicted as an aperture defined through the entirety of a thickness of the encapsulation material 518, it may be appreciated that this is merely one example. In other cases, the encapsulation material 518 can define one or more lenses, surfaces, reflective regions, and so on to impart one or more desired properties to the optical adapter 506.

It may be appreciated that the foregoing description of FIGS. 5D-5E, and various alternatives thereof and variations thereto are presented, generally, for purposes of explanation, and to facilitate a thorough understanding of various possible configurations of an optical structure including a convex lens separated from an optical adapter by a gap. However, it will be apparent to one skilled in the art that some of the specific details presented herein may not be required in order to practice a particular described embodiment, or an equivalent thereof.

Thus, it is understood that the foregoing descriptions of specific embodiments are presented for the purposes of illustration and description. These descriptions are not exhaustive nor intended to limit the disclosure to the precise forms recited herein. To the contrary, it will be apparent to one of ordinary skill in the art that many modifications and variations are possible in view of the above teachings.

Generally and broadly, FIGS. 6-10 depict simplified flow charts corresponding to various ordered and/or unordered operations of methods that may be used to manufacture one or more components such as described herein. It may be appreciated that these simplified examples may be modified in a variety of ways. In some examples, additional, alternative, or fewer operations than those depicted and described may be possible.

Figure 6:
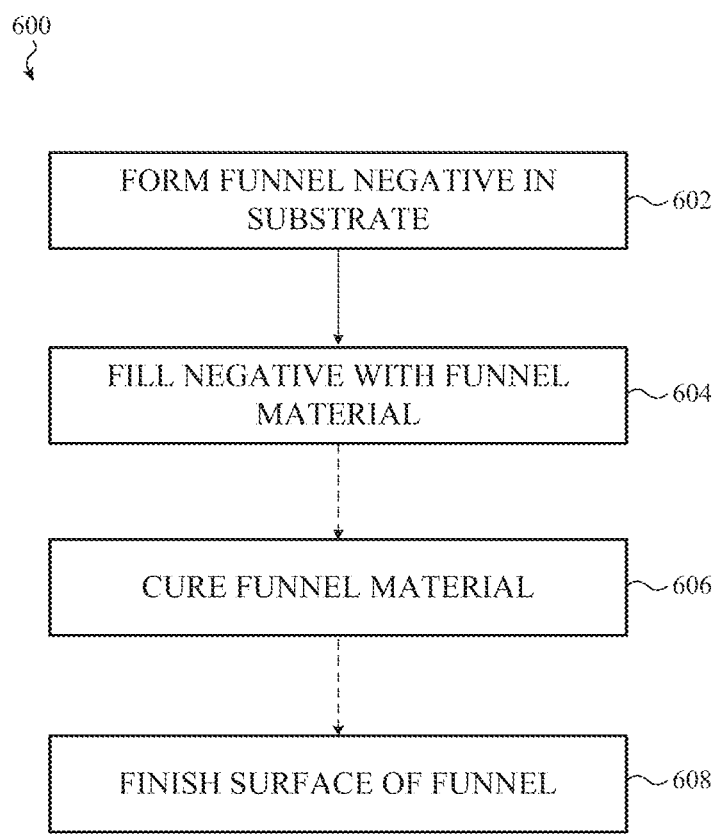
FIG. 6 is a simplified flow chart showing example operations of a method of forming an optical adapter, such as described herein.

FIG. 6 depicts a simplified flow chart showing example operations of a method of forming an optical adapter, such as described herein. The method 600 includes operation 602 in which a base substrate is selected and a negative of an optical adapter is formed into the substrate.

The substrate can be any suitable substrate and can be formed from any number of suitable optically clear materials. Suitable materials can include, without imitation: semiconductors; polymers; glass; ceramics; and so on. In some cases, the substrate is sacrificial, whereas in others, a single substrate negative can be used to manufacture multiple optical adapters. In some cases, the substrate is formed from a variety of different layers bonded or laminated together.

The method 600 also includes operation 604 in which the negative of the optical adapter is filled with a moldable material. The moldable material can be any suitable material including, but not limited to: glass; plastic; polymers; and so on.

In some cases, the substrate can be placed into an autoclave or other similar chamber in order to ensure that the moldable material occupies the entirety of the volume defined by the negative defined into the substrate. In other cases, a vacuum chamber may be used.

The method 600 also includes, optionally, operation 606 in which the moldable material is cured. In some cases, the operation 606 includes exposing the moldable material and substrate to ultraviolet light, heat, or pressure. It may be appreciated that different moldable materials may be associated with different curing techniques and/or curing conditions; an appropriate curing and/or hardening operation or series of operations can be selected based on a particular moldable material selected for a particular embodiment. Once the moldable material is cured, the optical adapter can be separated from the substrate using an appropriate technique. In other cases, the substrate may not be removed.

The method 600 also includes, optionally, a surface finishing operation. More specifically, one or more surfaces of the optical adapter can be (optionally) polished and/or finished in a particular selected manner. Example surface finishing operations include, but may not be limited to: chemical surface finishing operations; mechanical surface finishing operations; laser surface finishing operations; and so on. In some cases, a surface finishing operation includes depositing a reflective material into one or more surfaces of the optical adapter. In these examples, a surface finishing operation can include removing a reflective coating from a tip portion of an optical adapter that is configured to interface with a photosensitive area of a photosensitive element. For example, a tip of the optical adapter can be cut or filed to expose an optically clear internal body of the optical adapter. Typically, the optical adapter is cut or filed to a plane, which may be polished, configured to interface with (e.g., contact) an outer surface of a photosensitive area of a photosensitive element/In other cases, a reflective coating can be removed in a chemical, mechanical, or optical cutting, etching, abrasion, or ablation process.

Although the method described in reference to FIG. 6 references molding of a single optical adapter, it may be appreciated that more than one optical adapters can be manufactured simultaneously using the same method. In some cases, the mold negative described in references to operation 602 can be used to mold a substrate that includes one or more optical adapter, such as described in reference to FIGS. 4C-4G.

In still further examples, the operations 604-606 can be substituted for a reflow operation. In particular, in these embodiments, a reflowable material layer can be disposed over the substrate. Thereafter, the reflowable material can be subjected to conditions that cause the material to reflow into the mold negative. In still other embodiments, other manufacturing techniques can be used.

In some embodiments, a concave lens (see, e.g., FIGS. 5A-5C) can be formed atop the optical adapter. The concave lens can be formed, in one example, in a microlens manufacturing process, such as a deposition-reflow process.

Figure 7:
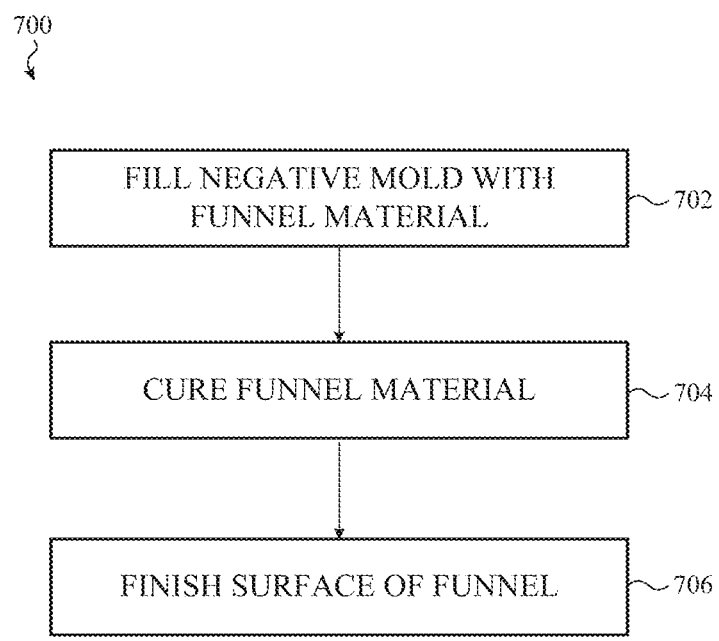
FIG. 7 is a simplified flow chart showing example operations of another method of forming an optical adapter, such as described herein.

For example, FIG. 7 depicts a simplified flow chart showing example operations of another method of forming an optical adapter, such as described herein. The method 700 includes operation 702 in which a negative mold of an optical adapter is formed into a substrate using a suitable technique (e.g., etching, laser ablation, machining, additive manufacturing or another three-dimensional printing operation, two-photon polymerization, and so on).

Thereafter, at operation 704, one or more layers can be deposited into the negative mold. The layers can be deposited (e.g., as a powder or liquid) in sequence until the negative mold is filled. As with other embodiments described herein, the negative and deposited material can be placed into an autoclave or vacuum chamber to assure that no gases remain in the volume/cavity defined by the negative.

Thereafter, at operation 706, the deposited material can be cured and/or otherwise solidified (if necessary). Once cured and/or solidified, the deposited material can be (optionally) separated from the mold negative. Once separated, if required, one or more surfaces of the optical adapter can be finished (e.g., polished).

As with the method depicted and described in reference to FIG. 6, in some embodiments, a concave lens (see, e.g., FIGS. 5A-5C) can be formed atop the optical adapter. The concave lens can be formed in a microlens manufacturing process, such as a deposition-reflow process.

Figure 8:
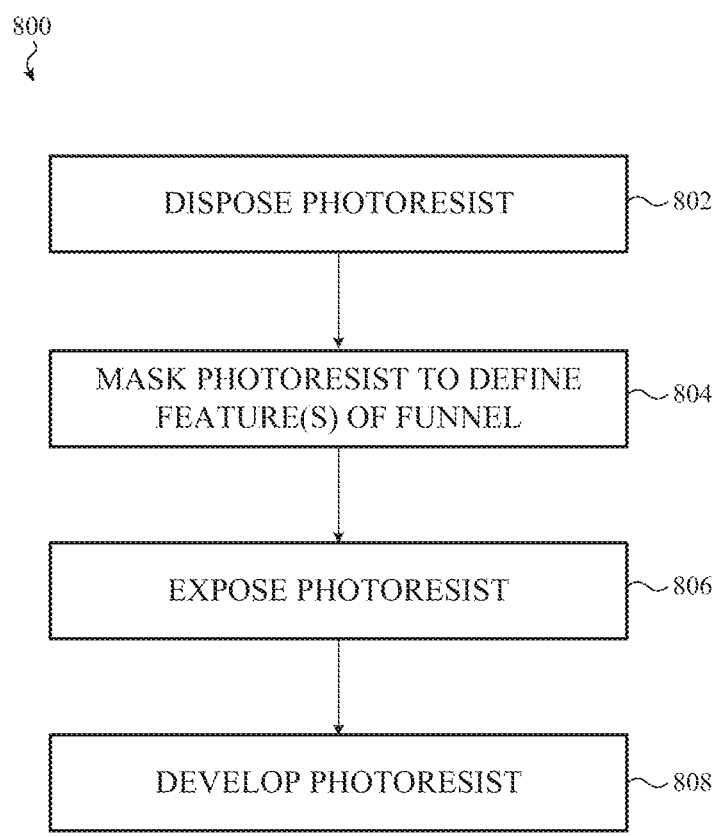
FIG. 8 is a simplified flow chart showing example operations of another method of forming an optical adapter, such as described herein.

FIG. 8 depicts a simplified flow chart showing example operations of another method of forming an optical adapter, such as described herein. The method 800 includes operation 802 in which a photoresist is disposed onto a substrate. Next, at operation 804, one or more features of an optical adapter can be defined by disposing an appropriate mask layer over the photoresist. Next, at operation 806, the photoresist can be exposed to an appropriate spectral range of light (e.g., ultraviolet light) to remove photoresist material not covered by the mask layer. Finally, at operation 808, the photoresist can be developed. In other words, the substrate, with exposed photoresist, can be etched or otherwise processed in order to define one or more features of an optical adapter. In some cases, more than one repetition of operations 806 to operation 808 may be required to define an optical adapter such as described herein.

In one specific example of the embodiment described above, a transparent glass substrate can be selected. A photoresist layer can be disposed over a surface of the substrate. A mask layer defining at least one circle can be disposed over the photoresist. As a result of this construction, after etching and/or other development processes, a columnar structure is formed, extending from a surface of the substrate. The columnar structure can then be progressively immersed in an etchant bath; portions of the columnar structure within the etchant bath for a longer period of time will be etched to a greater extent. In this manner, a taper can be formed.

Figure 9:
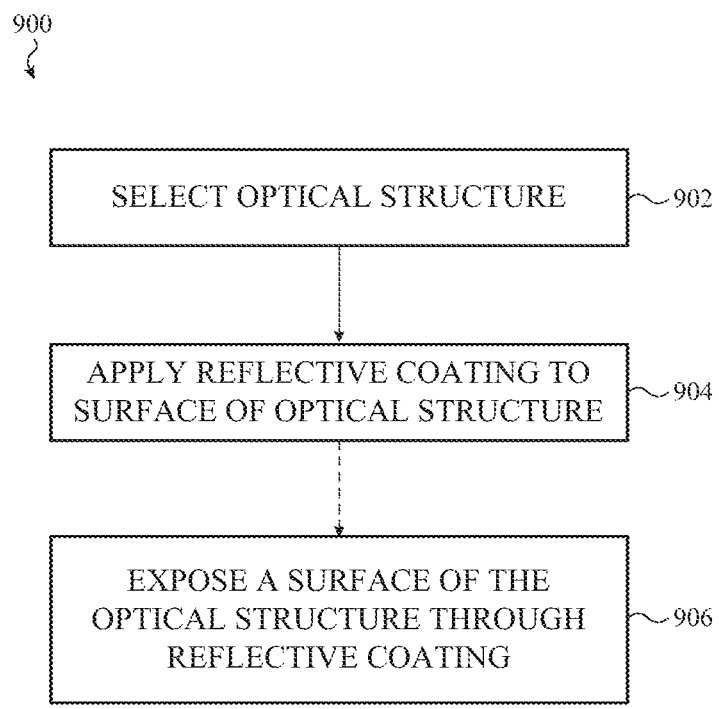
FIG. 9 is a simplified flow chart showing example operations of a method of applying a reflective coating to an optical structure.

FIG. 9 depicts a simplified flow chart showing example operations of a method of applying a reflective coating to an optical structure. The method 900 includes operation 902 in which a manufactured optical structure is selected. The optical structure can be a micro-scale optical structure, or a macro-scale structure. Next, at operation 904, a reflective coating can be applied to a surface of the optical structure. Finally, at operation 906, one or more surfaces of the coated optical structure can be exposed, for example by clipping, etching, or cutting. In other cases, a mask that was previously applied to the optical structure can be removed. In one specific implementation of this example, a conical optical adapter can be fully coated with a reflective material. Thereafter, a tip of the conical optical adapter can be clipped, and an end of the conical optical adapter can be optionally polished. In this manner, the two ends of the conical optical adapter are exposed; the reflective layer is removed.

Figure 10:
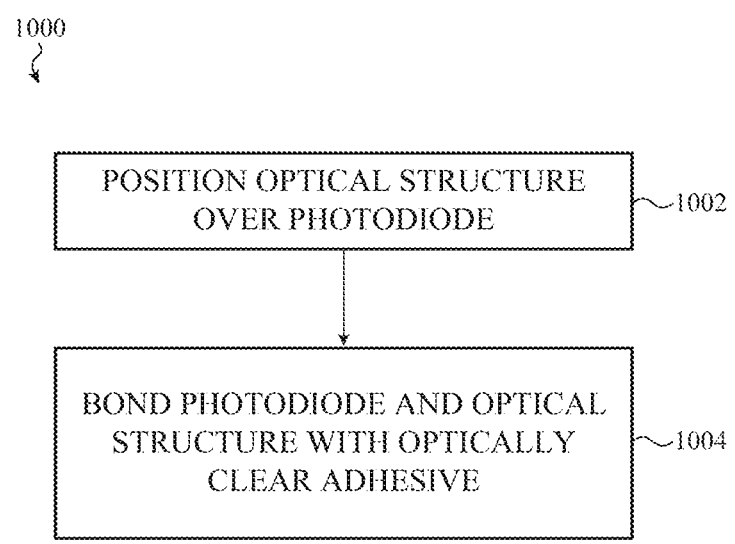
FIG. 10 is a simplified flow chart showing example operations of a method of optically coupling a photosensitive element to an optical structure.

FIG. 10 depicts a simplified flow chart showing example operations of a method of optically coupling a photosensitive element to an optical structure. The method 1000 includes operation 1002 in which an optical structure (see, e.g., FIG. 3, FIGS. 4A-5C) is positioned over a photodiode. Next, at operation 1004, the photodiode and the optical structure can be adhered and/or bonded together using an optically clear adhesive.

One may appreciate that although many embodiments are disclosed above, that the operations and steps presented with respect to methods and techniques described herein are meant as exemplary and accordingly are not exhaustive. One may further appreciate that alternate step order or, fewer or additional operations may be required or desired for particular embodiments.

Although the disclosure above is described in terms of various exemplary embodiments and implementations, it should be understood that the various features, aspects and functionality described in one or more of the individual embodiments are not limited in their applicability to the particular embodiment with which they are described, but instead can be applied, alone or in various combinations, to one or more of the some embodiments of the invention, whether or not such embodiments are described and whether or not such features are presented as being a part of a described embodiment. Thus, the breadth and scope of the present invention should not be limited by any of the above-described exemplary embodiments but are instead defined by the claims herein presented.

What is claimed is:

1. An electronic device for free-space optical communication comprising:
   a first substrate comprising a circuit;
   a photosensitive element coupled to the first substrate and to the circuit;
   a second substrate defined by a body having a thickness, the body defining a first face and a second face opposite the first face, the second substrate:
   positioned above, and parallel to, the first substrate; and
   extending along at least a portion of a length of the first substrate, the second substrate comprising:
      a convex protrusion proud of the first face; and
      a tapering protrusion aligned with an optical axis of the convex protrusion, the tapering protrusion proud of the second face and tapering toward the photosensitive element at an angle facilitating total internal reflection such that light incident to the convex protrusion is focused into the tapering protrusion, reflected from a sidewall of the tapering protrusion, and is received at the photosensitive element.

2. The electronic device of claim 1, wherein the thickness of the body is greater than a distance from the second planar face from which the tapering protrusion extends.

3. The electronic device of claim 1, wherein the first face is a first planar face and the second face is a second planar face.

4. The electronic device of claim 3, wherein the first planar face is parallel to the second planar face.

5. The electronic device of claim 1, wherein the photosensitive element comprises a photosensitive area having a radius of less than 50 um.

6. The electronic device of claim 5, wherein the photosensitive area has a diameter of less than 50 um.

7. The electronic device of claim 1, wherein the circuit comprises an amplifier conductively coupled to an output of the photosensitive element.

8. The electronic device of claim 1, wherein the body is formed from an optically transparent material.

9. The electronic device of claim 1, wherein the body is formed from one of glass or plastic.

10. The electronic device of claim 1, wherein the convex protrusion and the tapering protrusion are integrally formed with the body.

11. The electronic device of claim 1, wherein a first diameter of the convex protrusion is greater than a second diameter of the tapering protrusion.

12. The electronic device of claim 1, wherein the tapering protrusion tapers linearly from the second surface to the photosensitive element.

13. The electronic device of claim 1, wherein the tapering protrusion tapers in a curved manner from the second surface to the photosensitive element.

14. The electronic device of claim 1, comprising a reflective material disposed over an outer surface of the tapering protrusion.

15. An electronic device for free-space optical communication comprising:
  a first substrate comprising a circuit;
  a photosensitive element coupled to the first substrate and to the circuit;
  an encapsulation material disposed over the photosensitive element and defining a tapering cavity; and
  a second substrate defined by a body having a thickness, the body defining a first face and a second face opposite the first face, the second substrate:
    positioned above the first substrate; and
    extending along at least a portion of a length of the first substrate, the second substrate comprising:
      a first convex protrusion proud of the first face; and
      a second convex protrusion aligned with an optical axis of the first convex protrusion, the second convex protrusion proud of the second face such that light incident to the convex protrusion is focused toward the second convex protrusion, which in turn focuses the light into the tapering cavity so as to be received at the photosensitive element.

16. The electronic device of claim 15, wherein the thickness of the body is greater than a height of both the first convex protrusion or the second convex protrusion.

17. The electronic device of claim 15, further comprising a reflective coating disposed on a sidewall of the tapered cavity.

18. The electronic device of claim 15, wherein the reflective coating comprises a metallic material.

19. An electronic device for free-space optical communication comprising:
  a first substrate comprising a circuit;
  a photosensitive element coupled to the first substrate and to the circuit;
  an optical adapter positioned over the photosensitive element having a trapezoidal profile tapering toward the photosensitive element; and
  a second substrate defined by a body having a thickness, the body defining a first face and a second face opposite the first face, the second substrate:
    positioned above the first substrate; and
    extending along at least a portion of a length of the first substrate, the second substrate comprising:
      a first convex protrusion proud of the first face; and
      a second convex protrusion aligned with an optical axis of the first convex protrusion, the second convex protrusion proud of the second face such that light incident to the convex protrusion is focused toward the second convex protrusion, which in turn focuses the light into the optical adapter so as to be received at the photosensitive element.

20. The electronic device of claim 19, wherein the optical adapter and the second substrate are formed from a material transparent to infrared light.

* * * * *